United States Patent
Mikhaylik et al.

(10) Patent No.: US 9,490,478 B2
(45) Date of Patent: Nov. 8, 2016

(54) ELECTROCHEMICAL CELLS COMPRISING FIBRIL MATERIALS

(71) Applicant: Sion Power Corporation, Tucson, AZ (US)

(72) Inventors: Yuriy V. Mikhaylik, Tucson, AZ (US); David L. Coleman, Corona De Tucson, AZ (US)

(73) Assignee: Sion Power Corporation, Tucson, AZ (US)

( * ) Notice: Subject to any disclaimer, the term of this patent is extended or adjusted under 35 U.S.C. 154(b) by 265 days.

(21) Appl. No.: 14/197,782

(22) Filed: Mar. 5, 2014

(65) Prior Publication Data

US 2014/0255780 A1    Sep. 11, 2014

Related U.S. Application Data

(60) Provisional application No. 61/772,627, filed on Mar. 5, 2013.

(51) Int. Cl.
| | |
|---|---|
| *H01M 4/13* | (2010.01) |
| *H01M 4/139* | (2010.01) |
| *H01M 4/60* | (2006.01) |
| *H01M 4/62* | (2006.01) |
| *H01M 4/40* | (2006.01) |
| *H01M 4/36* | (2006.01) |
| *H01M 4/38* | (2006.01) |
| *H01M 4/04* | (2006.01) |

(52) U.S. Cl.
CPC .............. *H01M 4/405* (2013.01); *H01M 4/13* (2013.01); *H01M 4/139* (2013.01); *H01M 4/366* (2013.01); *H01M 4/38* (2013.01); *H01M 4/62* (2013.01); *H01M 4/0404* (2013.01); *Y02E 60/122* (2013.01)

(58) Field of Classification Search
CPC .. H01M 4/405; H01M 4/0404; H01M 4/622; Y02P 70/54
See application file for complete search history.

(56) References Cited

U.S. PATENT DOCUMENTS

| | | |
|---|---|---|
| 4,664,991 A | 5/1987 | Perichaud et al. |
| 4,739,018 A | 4/1988 | Armand et al. |
| 4,833,048 A | 5/1989 | De Jonghe et al. |
| 4,917,974 A | 4/1990 | De Jonghe et al. |
| 4,954,371 A | 9/1990 | Yializis |
| 5,162,175 A | 11/1992 | De Jonghe et al. |
| 5,314,765 A | 5/1994 | Bates |
| 5,324,599 A | 6/1994 | Kanbara et al. |
| 5,441,831 A | 8/1995 | Lee et al. |

(Continued)

FOREIGN PATENT DOCUMENTS

| | | |
|---|---|---|
| CN | 10289127 A | 1/2013 |
| JP | H06163024 A | 6/1994 |

(Continued)

OTHER PUBLICATIONS

International Search Report and Written Opinion mailed Jun. 26, 2014 for PCT/US2014/020764.

(Continued)

*Primary Examiner* — Rena L Dye
(74) *Attorney, Agent, or Firm* — Wolf, Greenfield & Sacks, P.C.

(57) ABSTRACT

The use of fibril materials, such as fibril cellulose materials and other similar materials, in electrochemical cells and components thereof is generally described.

25 Claims, 7 Drawing Sheets

(56) References Cited

U.S. PATENT DOCUMENTS

| | | | |
|---|---|---|---|
| 5,516,598 A | 5/1996 | Chu et al. | |
| 5,529,860 A | 6/1996 | Grigorevna et al. | |
| 5,536,323 A | 7/1996 | Binder al. | |
| 5,538,812 A | 7/1996 | Geng et al. | |
| 5,601,947 A | 2/1997 | Kovalev et al. | |
| 5,648,187 A | 7/1997 | Skotheim | |
| 5,681,615 A | 10/1997 | Affinito et al. | |
| 5,690,702 A | 11/1997 | Kovalev et al. | |
| 5,711,816 A | 1/1998 | Binder et al. | |
| 5,723,230 A | 3/1998 | Iizuka et al. | |
| 5,783,330 A | 7/1998 | Iizuka et al. | |
| 5,792,575 A | 8/1998 | Iizuka et al. | |
| 5,882,819 A | 3/1999 | Naoi et al. | |
| 5,919,587 A | 7/1999 | Mukherjee et al. | |
| 5,961,672 A | 10/1999 | Gavrilov et al. | |
| 6,117,590 A | 9/2000 | Kovalev et al. | |
| 6,124,058 A | 9/2000 | Ohmory et al. | |
| 6,153,337 A | 11/2000 | Carlson et al. | |
| 6,183,901 B1 | 2/2001 | Ying et al. | |
| 6,201,100 B1 | 3/2001 | Gorkovenko et al. | |
| 7,247,408 B2 | 7/2007 | Skotheim et al. | |
| 8,087,309 B2 | 1/2012 | Kelley et al. | |
| 8,900,747 B2 * | 12/2014 | Tamaki | H01M 10/0525 429/211 |
| 2006/0238203 A1 | 10/2006 | Kelley et al. | |
| 2007/0221265 A1 | 9/2007 | Affinito et al. | |
| 2007/0224502 A1 | 9/2007 | Affinito et al. | |
| 2008/0100264 A1 * | 5/2008 | Kolosnitsyn | H01M 4/133 320/127 |
| 2008/0187663 A1 | 8/2008 | Affinito | |
| 2008/0318128 A1 | 12/2008 | Simoneau et al. | |
| 2009/0200986 A1 | 8/2009 | Kopera | |
| 2010/0035128 A1 | 2/2010 | Scordilis-Kelley et al. | |
| 2010/0129699 A1 | 5/2010 | Mikhaylik et al. | |
| 2010/0239914 A1 | 9/2010 | Mikhaylik et al. | |
| 2011/0059361 A1 | 3/2011 | Wilkening et al. | |
| 2011/0068001 A1 | 3/2011 | Affinito et al. | |
| 2011/0070491 A1 | 3/2011 | Campbell et al. | |
| 2011/0070494 A1 | 3/2011 | Campbell et al. | |
| 2011/0076560 A1 | 3/2011 | Scordilis-Kelley et al. | |
| 2011/0165462 A1 | 7/2011 | Zhamu et al. | |
| 2011/0165466 A1 | 7/2011 | Zhamu et al. | |
| 2011/0177398 A1 | 7/2011 | Affinito et al. | |
| 2011/0206992 A1 | 8/2011 | Campbell et al. | |
| 2011/0229759 A1 | 9/2011 | Yazami et al. | |
| 2012/0048729 A1 | 3/2012 | Mikhaylik et al. | |
| 2012/0070746 A1 | 3/2012 | Mikhaylik et al. | |

FOREIGN PATENT DOCUMENTS

| | | | | |
|---|---|---|---|---|
| JP | H10102322 A | 4/1998 | | |
| JP | 2008-293883 A | 12/2008 | | |
| JP | 2008-293883 A2 | 12/2008 | | |
| JP | 2011-222389 A | 11/2011 | | |
| JP | WO 2012026009 A1 * | 3/2012 | ........ | H01M 10/0525 |
| WO | WO 99/33130 A1 | 7/1999 | | |
| WO | WO 2009/089018 A2 | 1/2009 | | |
| WO | WO 2009/017726 A1 | 2/2009 | | |
| WO | WO 2009/042071 A2 | 4/2009 | | |
| WO | WO 2009/054987 A1 | 4/2009 | | |
| WO | 2011/081944 A2 | 7/2011 | | |
| WO | 2012/008559 A1 | 1/2012 | | |
| WO | WO 2012161989 A1 * | 11/2012 | .............. | H01M 2/14 |

OTHER PUBLICATIONS

Affinito et al., Increasing Li-S battery cycle life, and improving safety, through application of a variety of coating techniques. Annual Technical Conference Proceedings. Apr. 16-21, 2011; 589-92.

Brunauer et al., Adsorption of gases in multimolecular layers. J. Am. Chem. Soc. 1938; 60:309-19.

Henriksson et al., Cellulose nanopaper structures of high toughness. Biomacromolecules. 2008; 9:1579-85.

Patel et al., Low surface area graphene/cellulose composite as a host matrix for lithium sulphur batteries. Journal of Power Sources. 2014; 254:55-61.

[No Author] UPM Fibril Cellulose, Novel Biomaterial for Industrial Use, Brochure. UPM, the Biofore Company. Last accessed Apr. 16, 2012 via http://www.upm.com/fibrilcellulose. 8 pages.

Extended European Search Report for EP 14760152.0 mailed Aug. 19, 2016.

* cited by examiner

300

ELECTROCHEMICAL CELLS COMPRISING FIBRIL MATERIALS

RELATED APPLICATIONS

This application claims priority under 35 U.S.C. §119(e) to U.S. Provisional Patent Application Ser. No. 61/772,627, filed Mar. 5, 2013, and entitled "Electrochemical Cells Comprising Fibril Materials, Such as Fibril Cellulose Materials," which is incorporated herein by reference in its entirety for all purposes.

TECHNICAL FIELD

The use of fibril materials, such as fibril cellulose materials and other similar materials, in electrochemical cells and components thereof is generally described.

BACKGROUND

An electrochemical cell typically includes a positive electrode and a negative electrode which participate in an electrochemical reaction to produce electrical current. Generally, electrochemical reactions are facilitated by an electrolyte, which can contain free ions and can behave as an ionically conductive medium.

The performance of an electrochemical cell can be enhanced by increasing the amount of contact between an electrode active material and the electrolyte, which can lead to an increase in the rate of the electrochemical reaction within the cell. In addition, the performance of an electrochemical cell can be enhanced by maintaining a high degree of electrical conductivity within the bulk of the electrodes. In some previous electrochemical cells, these objectives can be accomplished to some extent by employing porous electrodes comprising an electrode active material positioned on or within a support structure, such as an agglomeration of porous carbon particles.

The performance of an electrochemical cell, including electrochemical cells in which lithium is used as an electrode active material, can further be enhanced by applying an anisotropic force to the electrochemical cell.

SUMMARY

The use of fibril materials, such as fibril cellulose and similar materials, in electrochemical cells and components thereof is generally described. In certain embodiments, the fibril materials can serve to mechanically reinforce the electrochemical cell or electrochemical cell components. The subject matter of the present invention involves, in some cases, interrelated products, alternative solutions to a particular problem, and/or a plurality of different uses of one or more systems and/or articles.

In one aspect, an electrode is provided. The electrode comprises, in certain embodiments, an electrochemically active material and electronically non-conductive and/or polymeric fibrils in contact with at least a portion of the electrochemically active material and/or a support material supporting the electrochemically active material. In some embodiments, at least a portion of the fibrils have maximum cross-sectional diameters of less than about 1 micrometer and aspect ratios of at least about 10:1.

In some embodiments, the electrode comprises an electrochemically active material, a protective layer over the electrochemically active material, and a fibril material within the protective layer and/or within a fibril-containing layer over the protective layer. In some embodiments, at least a portion of the fibrils are electronically non-conductive and/or polymeric, and at least a portion of the fibrils have maximum cross-sectional diameters of less than about 1 micrometer and aspect ratios of at least about 10:1.

In certain embodiments, an electrochemical cell is provided. The electrochemical cell comprises, in certain embodiments, a negative electrode, a positive electrode, and an electrolyte in electrochemical communication with the negative electrode and the positive electrode, wherein the electrolyte comprises a plurality of fibrils comprising cellulose or a cellulose derivative having maximum cross-sectional diameters of less than about 1 micrometer and aspect ratios of at least about 10:1.

In some embodiments, the electrochemical cell comprises a negative electrode, a positive electrode, and an electrolyte in electrochemical communication with the negative electrode and the positive electrode, wherein the electrolyte comprises a plurality of polymeric and/or electronically non-conductive fibrils having maximum cross-sectional diameters of less than about 10 nanometers and aspect ratios of at least about 10:1.

The electrochemical cell comprises, in some embodiments, a negative electrode, a positive electrode, and an electrolyte in electrochemical communication with the negative electrode and the positive electrode, wherein at least one of the negative electrode, the positive electrode, and the electrolyte comprises a fibril material comprising cellulose or a cellulose derivative.

In one aspect, a method is provided. The method comprises, in certain embodiments, preparing a suspension comprising a particulate support material and fibrils suspended in a liquid carrier, coating at least a portion of a substrate with the suspension, and removing at least a portion of the liquid carrier from the suspension. In some embodiments, at least a portion of the fibrils are electronically non-conductive and/or polymeric, and at least a portion of the fibrils have maximum cross-sectional diameters of less than about 1 micrometer and aspect ratios of at least about 10:1.

In one set of embodiments, the method comprises providing an electrode comprising a layer of electrochemically active material and a protective layer over the layer of electrochemically active material, and positioning a fibril-containing layer adjacent the protective layer.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
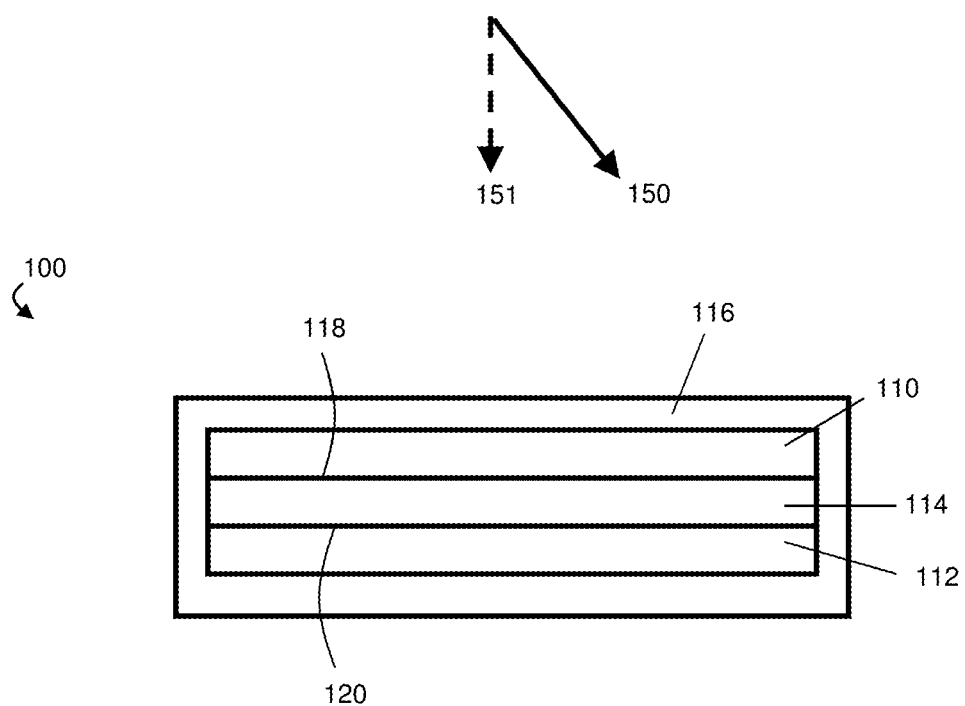
FIG. 1 is a cross-sectional schematic illustration of an electrochemical cell, according to certain embodiments.

The use of fibril materials, such as fibril cellulose and similar materials, in electrochemical cells and electrochemical cell components is generally described. The fibril materials can, in some embodiments, provide mechanical reinforcement of one or more components of the electrochemical cell. In certain embodiments, the use of such fibril materials in various parts of an electrochemical cell can allow one to apply an anisotropic force to the electrochemical cell without structurally damaging or otherwise structurally compromising the electrochemical cell. Fibril material can be incorporated into an electrode, a separator, and/or an electrolyte material (e.g., a gel electrolyte material and/or a solid electrolyte material) within an electrochemical cell. In some embodiments, the fibril material can replace or supplement a binder used to provide structural support to a component of an electrochemical cell.

Certain of the embodiments described herein can be particularly useful in electrochemical cells in which an anisotropic force is applied to the electrochemical cell during use. U.S. Patent Publication No. 2010/0035128 to Scordilis-Kelley et al. filed on Aug. 4, 2009, entitled "Application of Force in Electrochemical Cells," (which is incorporated herein by reference in its entirety for all purposes) describes the application of force in electrochemical cells for improved electrode chemistry, morphology, and/or other characteristics indicative of improved cell performance. Some electrochemical cells (e.g., rechargeable electrochemical cells) undergo a charge/discharge cycle involving deposition of metal (e.g., lithium metal or other active material) on a surface of an electrode (e.g., a negative electrode) upon charging and reaction of the metal on the electrode surface, wherein the metal diffuses from the negative electrode surface, upon discharging. The uniformity with which the metal is deposited in such cells may affect cell performance. As one non-limiting example, when lithium metal is removed from and/or redeposited on a negative electrode, it may, in some cases, result in an uneven surface; for example, upon redeposition, lithium may deposit unevenly forming a rough surface. The roughened surface may increase the amount of lithium metal available for undesired chemical reactions which may result in decreased cycling lifetime and/or poor cell performance. The application of an anisotropic force with a component normal to an electrode active surface within the electrochemical cell has been found to reduce such behavior and to improve the cycling lifetime and/or performance of the cell.

However, when anisotropic forces are applied to electrochemical cells containing relatively fragile electrodes and/or electrolytes, electrolyte separators, or other components that are relatively easy to rip, tear, or otherwise compromise, cell performance can be adversely impacted. As one non-limiting example, if an electrochemical cell comprises an electrode having components that are held together using a material that is relatively easy to deform and/or that can be yielded relatively easily (such as, for example, certain binders that are used to hold together porous particles within an electrode), the application of an anisotropic force could reduce the porosity of the electrode (e.g., by compressing the electrode material or yielding the adhesive material within the electrode), thus causing a reduction in cell performance. As another non-limiting example, if an electrochemical cell comprises an electrolyte and/or an electrolyte separator that yields, ruptures, or otherwise easily deforms, application of an anisotropic force could produce a short circuit within the electrochemical cell. Accordingly, the incorporation of a material that adds structural stability to the electrochemical cell can be very important, in many instances.

In certain embodiments, the fibril materials described herein provide a large degree of structural reinforcement, even when small amounts of the fibril material are used. The ability to minimize the amount of reinforcement material used in an electrochemical cell can allow one to produce cells with relatively high energy densities and specific energies, by reducing the total volume within the cell that is occupied by the reinforcement material, relative to the electrochemically active components of the cell.

In certain embodiments, the fibrils can be electronically non-conductive. For example, in certain embodiments, the fibrils have a bulk electronic resistivity of at least about resistivity at least about $10^6$ ohm-m, at least about $10^8$ ohm-m, at least about $10^{10}$ ohm-m, at least about $10^{12}$ ohm-m, or at least about $10^{14}$ ohm-m at 20° C.

In some embodiments, the fibrils comprise a polymer. All or part of the fibrils can be formed of a naturally occurring polymer, in certain embodiments. In some embodiments, the fibrils comprise a polysaccharide. For example, the fibrils can comprise glucose, in some embodiments. In some embodiments, the fibrils comprise cellulose or a cellulose derivative. The cellulose derivative may comprise a cellulose-based polymer substituted with one or more types of functional groups, including alkyl, aryl, heteroalkyl, heteroaryl, heterocycle, carbonyl, halo, hydroxyl, nitro, sulfo, cyano, alcohol groups, combinations thereof, and the like. In some embodiments, the cellulose derivative is a carboxyalkyl cellulose. Examples of suitable cellulose derivatives include, but are not limited to, carboxymethylcellulose (CMC), methylcarboxymethyl cellulose (MCMC), hydroxyethylcarboxymethyl cellulose (HECMC), hydroxyethylmethylcarboxy methylcellulose (HEMCMC), sulfoethylcarboxymethyl cellulose (SECMC), hydroxyethylhydroxypropyl cellulose (HEHPC), hydroxyethylethyl cellulose (HEEC), hydroxyethylsulfoethyl cellulose (HESEC), hydroxypropyl methylcellulose (HPMC), hydroxyethylcellulose (HEC), hydroxypropylcellulose (HPC), hydroxyethylmethylcellulose (HEMC), hydroxyethylmethylcellulose (HEMC), methylcellulose (MC), or combinations of these. Those of ordinary skill in the art are familiar with techniques for producing fibril materials, including cellulosic fibril materials. For example fibril materials containing polysaccharides (e.g., cellulose and/or derivatives thereof) can be obtained from plant matter containing fibrils of polysaccharides. For example, cellulose fibers within plant matter can be deconstructed (e.g., using acid hydrolysis) to produce cellulose fibrils. Large scale production of fibril cellulose has been undertaken, for example, by UPM (Helsinki, Finland) and Innventia (Stockholm, Sweden).

The fibrils can have, in certain embodiments, relatively small maximum cross-sectional diameters. In some embodiments, at least a portion of the fibrils have maximum cross-sectional diameters of less than about 1 micrometer, less than about 100 nanometers, less than about 10 nanometers, or less than about 1 nanometer (and/or, in certain embodiments, down to about 0.01 nanometers, or smaller). In some embodiments at least about 10%, at least about 25%, at least about 50%, at least about 75%, at least about 90%, or at least about 95% of the total volume occupied by the fibril material is made up of fibrils have maximum cross-sectional diameter of less than about 1 micrometer, less than about 100 nanometers, less than about 10 nanometers, or less than about 1 nanometer (and/or, in certain embodiments, down to about 0.01 nanometers, or smaller).

The fibrils can be elongated, in certain embodiments. For example, in some embodiments, the fibrils have aspect ratios of at least about 10:1, at least about 100:1, or at least about 1000:1 (and/or, in certain embodiments, up to about 10,000:1, or more). In some embodiments at least about 10%, at least about 25%, at least about 50%, at least about 75%, at least about 90%, or at least about 95% of the total volume occupied by the fibril material is made up of fibrils having aspect ratios of at least about 10:1, at least about 100:1, or at least about 1000:1 (and/or, in certain embodiments, up to about 10,000:1, or more).

Certain embodiments relate to electrochemical cells comprising fibril materials. In certain embodiments, at least one component of the electrochemical cell comprises a fibril material, which can be used, for example, to structurally reinforce the component of the electrochemical cell. The term "electrochemical cell" includes primary and secondary electrochemical cells. Accordingly, the inventive electrochemical cell arrangements and materials described herein can be used in primary cells and/or in secondary cells (including primary batteries and secondary batteries), which can be charged and discharged numerous times. In some embodiments, the materials, systems, and methods described herein can be used in association with lithium-based electrochemical cells, and batteries thereof. In certain embodiments, the porous support structures and/or electrodes described herein can be used in lithium-sulfur batteries.

Although the present invention can find use in a wide variety of electrochemical devices, an example of one such device is provided in FIG. 1 for illustrative purposes only. FIG. 1 is a schematic illustration of an electrochemical cell 100 comprising a positive electrode 110 and a negative electrode 112. In addition, the electrochemical cell comprises electrolyte 114. The electrolyte can include one or more components in electrochemical communication with the positive electrode and the negative electrode. While the negative electrode, positive electrode, and electrolyte in FIG. 1 are shown as having a planar configuration, other embodiments may include non-planar configurations (e.g., cylindrical, serpentine, etc.). In FIG. 1, electrochemical cell 100 also includes a housing structure 116.

Of course, the orientation of the components can be varied, and it should be understood that there are other embodiments in which the orientation of the layers is varied. Additionally, non-planar arrangements, arrangements with proportions of materials different than those shown, and other alternative arrangements are useful in connection with the present invention. A typical electrochemical cell also would include, of course, current collectors, external circuitry, and the like. Those of ordinary skill in the art are well aware of the many arrangements that can be utilized with the general schematic arrangement as shown in the figures and described herein.

Certain embodiments relate to electrodes into which fibril material has been incorporated, for example, to mechanically reinforce the electrode. Such electrodes can be used in electrochemical cells (as discussed above, for example) and/or in other devices in which electrodes are employed. Electrodes comprising fibril material can be used as negative electrodes and/or positive electrodes, as described in more detail below. The fibril material can be in contact with and/or at least partially surrounded by an electrochemically active material within the electrode and/or a material that is not electrochemically active, such as a support material (e.g., a binder, a material that imparts electronic conductivity to the electrode (e.g., metal particles, carbon particles, and the like, porous or otherwise)) and/or any other material within the electrode.

In some embodiments, fibril material can be incorporated into porous electrodes. For example, in certain embodiments, the electrode comprises a support material and an electrochemically active material mixed with the support material. The support material can, in certain embodiments, support the electrochemically active material. In certain such embodiments, fibrils are in contact with and/or at least partially surrounded by at least a portion of the electrochemically active material and/or the support material.

Figure 2:
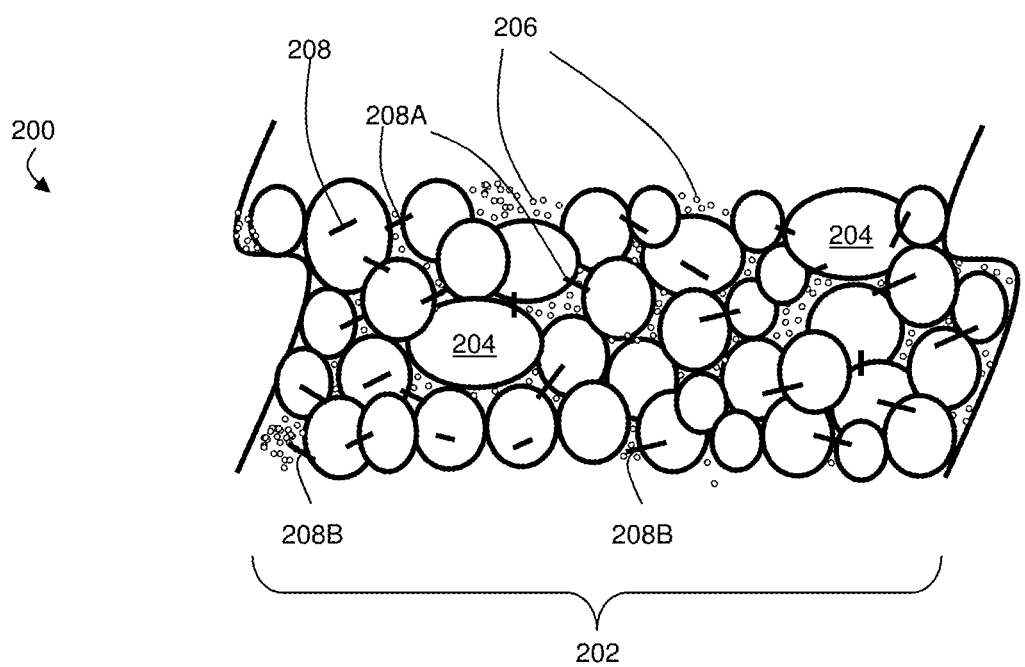
FIG. 2 is, according to one set of embodiments, a cross-sectional schematic illustration of an electrode.

In some embodiments, the electrode comprises a matrix comprising the electrochemically active material, the fibrils, and one or more support materials (e.g., a plurality of particles (which may be electrically conductive) and/or a binder). FIG. 2 is a cross-sectional schematic illustration of one such electrode 200, according to certain embodiments. In FIG. 2, electrode 200 comprises support material 202. The support material can comprise a plurality of particles, such as particles 204 that form support material 202. Particles 204 can be formed of a variety of suitable materials, including carbon, metal, and ceramic materials, as described in detail below. Electrode 200 can also comprise electrochemically active material 206. The electrochemically active material can be located within pores formed between the particles (i.e., interparticle pores), within pores formed within the particles (i.e., intraparticle pores), or both. In certain embodiments, electrode 200 also comprises a binder, which is not illustrated in FIG. 2 for purposes of clarity.

Electrode 200 can further comprise a plurality of fibrils 208 in contact with at least a portion of electrochemically active material 206 and/or support material 202. In certain embodiments, the fibrils mechanically join at least a portion of support material particles (e.g., electronically conductive support material particles) to each other. For example, in FIG. 2, fibrils 208A mechanically join support material particles to each other. In some embodiments, the fibrils join at least a portion of the electronically conductive particles to the electrode active material. For example, in FIG. 2, fibrils 208B mechanically join support material particles to electrochemically active material. The fibrils can also be present within a support material. For example, fibrils may be at least partially surrounded by a binder or other support material within the electrode. In some such embodiments, the presence of the fibrils mechanically strengthens the support material, for example, providing resistance against deformation and/or yield of the support material, such as a binder.

Porous electrodes comprising fibril materials can be made using any suitable method. In certain embodiments, the electrode is made by preparing a suspension comprising the fibril material and a support material suspended in a liquid carrier. The suspension can then be used to coat at least a portion of a substrate, such as a current collector. After the suspension has been coated, at least a portion of the liquid carrier can be removed.

In certain embodiments, electrode active material can be mixed with the support material and/or the fibrils. In some such embodiments, the electrode active material can be mixed with the support material and the fibrils prior to coating the suspension (e.g., the electrode active material can be a component of the suspension). In some embodiments, the electrode active material can be mixed with the support material and the fibrils after the suspension has been coated. In some such embodiments, the electrode active material is mixed with the support material and the fibrils prior to drying the suspension to remove at least a portion of the liquid carrier. The electrode active material could be mixed with the support material and the fibrils, in some embodiments, after at least a portion (or after substantially all) or the liquid carrier has been removed.

The support material can comprise, for example, a particulate material, such as particulate material 204 in FIG. 2. In certain embodiments, the particles of the support material can have maximum cross-sectional dimensions of less than about 5 millimeters, less than about 1 millimeter, or less than about 500 micrometers. The particulate material can be porous or non-porous and can be made of a variety of materials including, but not limited to, carbon, one or more metals, one or more ceramics, and the like.

In certain embodiments, the support material comprises a binder. A "binder material" refers to any material that, when present within the electrode, may enhance adhesion and cohesion of components of the electrode. Suitable binder materials may be selected such that they are compatible with (e.g., inert with respect to) other components of the cell including, but not limited to, the positive electrode, the negative electrode, and the electrolyte. For example, the electrochemical cell may comprise polysulfides, and the binder material may be selected such that it does not contain particular functional groups such as carbonyl groups (e.g., esters, ketones, aldehydes, and the like), which may react with polysulfides within the cell during operation and may contaminate the cell with substantially irreversibly-formed side products. The binder material may also be selected to exhibit good adhesion to the support material (e.g., porous carbon material) and/or does not crack or become delaminated during processing or during cell operation. In some cases, the binder material may be selected to be substantially insoluble with respect to the electrolyte, i.e., the binder material may not be dissolved by the electrolyte, and/or to be appreciably soluble with respect to a liquid carrier. The binder material may be provided in a solvent in which the binder material is substantially soluble. In some cases, the binder material may be substantially soluble in non-aqueous liquid carriers. In some cases, the binder material may be substantially soluble in aqueous liquid carriers.

In some embodiments, the binder material may be a polymeric material. Examples of polymer binder materials include, but are not limited to, polyvinylidene fluoride (PVDF)-based polymers, such as poly(vinylidene fluoride) (PVDF) and its co- and terpolymers with hexafluoroethylene, tetrafluoroethylene, chlorotrifluoroethylene, poly(vinyl fluoride), polytetraethylene (PTFE), ethylene-tetrafluoroethylene copolymers (ETFE), polybutadiene, cyanoethyl cellulose, carboxymethyl cellulose and its blends with styrene-butadiene rubber, polyacrylonitrile, ethylene propylene diene terpolymers, styrene-butadiene rubbers (SBR), polyimides or ethylene-vinyl acetate copolymers. In some cases, the binder material may be substantially soluble in aqueous liquid carriers and may include, but is not limited to, cellulose derivatives, typically methylcellulose (MC), carboxy methylcellulose (CMC) and hydroxypropyl methylcellulose (HPMC), polyvinyl alcohol (PVA), polyacrylic acid salts, polyacryl amide (PA), polyvinyl pyrrolidone (PVP) or polyethylene oxide (PEO). In one set of embodiments, the binder material is poly(ethylene-co-propylene-co-5-methylene-2-norbornene) (EPMN), which may be chemically neutral (e.g., inert) towards cell components, including polysulfides.

In some embodiments, the use of fibril materials within the porous electrode can reduce the need for binder materials. In certain embodiments, the porous electrode comprises a porous support structure (i.e., the electrode structure without electrode active material) having binder present in an amount of less than about 10 wt % (i.e., weight percent), less than about 5 wt %, less than about 2 wt %, or less than about 1 wt %. In certain embodiments, the ability to produce an electrode with relatively small amounts of binder can allow one to produce a relatively thick electrode that maintains sufficient porosity to be effective in an electrochemical cell. Accordingly, in certain embodiments, the electrode can have a thickness of at least about 10 microns, at least about 100 microns, at least about 500 microns, at least about 1 millimeter, or thicker (and/or, in certain embodiments, up to about 10 millimeters, or thicker).

In certain embodiments, the use of fibril materials (e.g., fibrils comprising cellulose or cellulose derivatives) can allow for the production of porous cathodes having very smooth exposed surfaces, with minimal cracking. In some embodiments, the yield strength can increase as the electrochemical cell is subjected to repeated cycles of charging and discharging (e.g., in which anisotropic forces are applied). Not wishing to be bound by any particular theory, it is believed that such fibrils can reorganize the network structure of the electrode over repeated stress loads, which can be beneficial, for example, for electrochemical cells working under pressure and/or exhibiting substantial electrode volume changes during charge-discharge cycles.

In some embodiments, the suspension used to form the porous electrode comprises a liquid carrier. The liquid carrier may be selected such that the active electrode species is not appreciably miscible or soluble with respect to the liquid carrier, in certain embodiments. This may be advantageous in selectively arranging the electrode material at certain locations on the porous material. In some embodiments, the fluid carrier used during formation of the electrode may be selected such that it exhibits a high vaporization rate at a temperature below the temperature at which the support material and/or electrode active material may decompose. Examples of liquid carriers which may be used in the electrode formation methods described herein include solvents such as benzene, p-cresol, toluene, xylene, diethyl ether, glycol monomethyl or dimethyl ether, petroleum ether, heptane, hexane, pentane, cyclohexane, methylene chloride, chloroform, carbon tetrachloride, dioxane, tetrahydrofuran (THF), methanol, ethanol, isoproanol, dimethyl sulfoxide, dimethylformamide, hexamethyl-phosphoric triamide, water, ethyl acetate, acetone, pyridine, triethylamine, picoline, mixtures thereof, and the like. Those of ordinary skill in the art would be able to select the appropriate liquid carrier suitable for use in a particular application. For example, the liquid carrier may be selected based on its volatility (e.g., boiling point), solubility or miscibility with other materials, and the like.

The particulate material used to form the porous electrodes described herein (including, for example, particles 204 in FIG. 2) can be formed of a variety of suitable materials. In some embodiments, the particulate material can be used as an electronic conductor within the electrode (e.g., as an electrolyte-accessible conductive material). Accordingly, the particulate material may comprise an electronically conductive material. Examples of electronically conductive materials that may be suitable for use include, but are not limited to, metals (e.g., nickel, copper, aluminum, iron, or any other suitable metal or combination in pure or alloyed form), carbon (e.g., graphite, carbon black, acetylene black, carbon fibers, carbon nanofibers, hallow carbon tubes, graphene, carbon filaments, etc.), electrically conductive polymers, or any other suitable electrically conductive material. In some embodiments, the particulate material may comprise an electrically non-conductive material that is at least partially coated (e.g., via solution-based deposition, evaporative deposition, or any other suitable technique) with an electronically conductive material. In some embodiments, the bulk of the particulate material may comprise a glass (e.g., silicon dioxide, amorphous silica, etc.), a ceramic (e.g., aluminum oxide, tin oxide, vanadium oxide, and others described below), a semiconductor (e.g., silicon, germanium, gallium arsenide, etc.), non-conductive polymers, and the like, which, as noted above, can be at least partially coated with electronically conductive material to impart electronic conductivity to the electrode, in certain embodiments.

The use of fibril materials in porous electrodes (e.g., porous positive electrodes containing, for example, sulfur as an electrode active material) can be beneficial in maintaining the pore properties of the porous electrodes, including the total pore volume and the pore size distribution of the porous electrode. As used herein, a "pore" refers to a pore as measured using ASTM Standard Test D4284-07, and generally refers to a conduit, void, or passageway, at least a portion of which is surrounded by the medium in which the pore is formed. Generally, voids within a material that are completely surrounded by the material (and thus, not accessible from outside the material, e.g., closed cells) are not considered pores within the context of the invention. Pores may comprise any suitable cross-sectional shape including irregular shapes and regular shapes (e.g., substantially circular shapes, substantially elliptical shapes, substantially polygonal shapes, and the like).

In certain embodiments, the porous electrodes described herein can have porous support structure (i.e., structures that include pores that support the electrode active material) with relatively high total porosity percentages. As used herein, the total porosity percentage of the porous support structure of a porous electrode is defined as the void volume of the porous support structure (in the absence of the electrode active material within the electrode) divided by the volume defined by the external geometric surfaces of the porous support structure, expressed as a percentage. The void volume of a porous support structure includes the volume of pores accessible by fluid from the outside of the electrode, but does not include pores that are completely enclosed and therefore inaccessible by fluid from outside the electrode. One of ordinary skill in the art would be capable of determining the void volume of a given porous support structure using, for example, mercury intrusion porosimetry. Electrodes comprising porous support structures with high total porosity percentages can provide a relatively large amount of area over which electrolyte can interact with electrode active material within a relatively small volume, which can lead to gains in energy density and specific energy. In certain embodiments, the total porosity percentage of the porous support structures within porous electrodes described herein can be at least about 30%, at least about 45%, at least about 60%, at least about 70%, at least about 80%, or at least about 90% (and/or, in certain embodiments, up to about 95%, up to about 97%, up to about 99%, or more).

In certain embodiments, the pore size distribution of the porous support structures within porous electrodes can be selected to impart favorable properties. In some embodiments, a porous support structure can be configured to include pores with cross-sectional diameters that are larger than sub-nanometer scale and single nanometer scale pores, which can become clogged and/or can be too small to allow for the passage of electrolyte (e.g., liquid electrolyte) into the pores of the porous support structure. As one specific example, in some cases in which the porous support structure is configured for use in an electrode of a lithium-sulfur battery, if the pores within the porous support structure are too small, they may become clogged with $Li_2S$, which can be formed as a side-product of the lithium-sulfur chemistry. In certain embodiments, the porous support structure can be configured to include pores with cross-sectional diameters that are smaller than millimeter-scale pores, which may be so large that they render the electrode mechanically unstable.

The distribution of the cross-sectional diameters of the pores within a given porous support structure can be chosen to enhance the performance of the electrochemical cell. As used herein, the "cross-sectional diameter" of a pore refers to a cross-sectional diameter as measured using ASTM Standard Test D4284-07, which is incorporated herein by reference in its entirety. The "average cross-sectional diameter" of a plurality of pores refers to the number average of the cross-sectional diameters of each of the plurality of the pores. One of ordinary skill in the art would be capable of calculating the distribution of cross-sectional diameters and the average cross-sectional diameter of the pores within a porous structure using mercury intrusion porosimetry as described in ASTM Standard Test D4284-07. For example, the methods described in ASTM Standard Test D4284-07 can be used to produce a distribution of pore sizes plotted as the cumulative intruded pore volume as a function of pore diameter. To calculate the percentage of the total pore volume within the sample that is made up of pores within a given range of pore diameters, one would: (1) calculate the area under the curve that spans the given range over the x-axis, (2) divide the area calculated in step (1) by the total area under the curve, and (3) multiply by 100%. Optionally, in cases where the porous support structures includes pore sizes that lie outside the range of pore sizes that can be accurately measured using ASTM Standard Test D4284-07, porosimetry measurements may be supplemented using Brunauer-Emmett-Teller (BET) surface analysis, as described, for example, in S. Brunauer, P. H. Emmett, and E. Teller, *J. Am. Chem. Soc.*, 1938, 60, 309.

In some embodiments, the porous support structure can be said to comprise a plurality of pores, wherein each pore of the plurality of pores has a pore volume, and the plurality of pores has a total pore volume defined by the sum of each of the individual pore volumes. In certain embodiments, at least about 50%, at least about 75%, at least about 90%, at least about 99%, or substantially all of the total pore volume in the porous support structure is defined by pores having cross-sectional diameters of less than or equal to about 10 micrometers, less than or equal to about 5 micrometers, or less than or equal to about 3 micrometers. In certain embodiments, at least about 50%, at least about 75%, at least about 90%, at least about 99%, or substantially all of the total pore volume in the porous support structure is defined by pores having cross-sectional diameters of greater than or equal to about 0.1 micrometers, greater than or equal to 0.5 micrometers, or greater than or equal to 1 micrometer (e.g., between about 0.1 micrometers and about 10 micrometers, between about 0.1 micrometers and about 5 micrometers, between about 0.1 micrometers and about 3 micrometers, between about 0.5 micrometers and about 10 micrometers, between about 0.5 micrometers and about 5 micrometers, between about 0.5 micrometers and about 3 micrometers, between about 1 micrometers and about 10 micrometers, between about 1 micrometer and about 5 micrometers, or between about 1 micrometer and about 3 micrometers). Generally, the porosity of a porous support structure is determined in the absence of electrode active material within the pores of the porous support structure. This can be achieved, for example, by removing the electrode active material from the pores of the small-scale porous support structure and subsequently performing mercury intrusion porosimetry and/or by performing porosimetry before electrode active material has been added to the porous support structure.

In some embodiments, the porous electrode may comprise a porous support structure comprising pores with relatively uniform cross-sectional diameters. Not wishing to be bound by any theory, such uniformity may be useful in maintaining relatively consistent structural stability throughout the bulk of the porous support structure or a porous electrode fabricated from the porous support structure. In addition, the ability to control the pore size to within a relatively narrow range can allow one to incorporate a large number of pores that are large enough to allow for fluid penetration (e.g., electrolyte penetration) while maintaining sufficiently small pores to preserve structural stability. In some embodiments, the distribution of the cross-sectional diameters of the pores within a porous support structure or an assembled electrode can have a standard deviation of less than about 50%, less than about 25%, less than about 10%, less than about 5%, less than about 2%, or less than about 1% of the average cross-sectional diameter of the plurality of pores. Standard deviation (lower-case sigma) is given its normal meaning in the art, and can be calculated as:

$$\sigma = \sqrt{\frac{\sum_{i=1}^{n}(D_i - D_{avg})^2}{n-1}}$$

wherein $D_i$ is the cross-sectional diameter of pore i, $D_{avg}$ is the average of the cross-sectional diameters of the plurality of pores, and n is the number of pores. The percentage comparisons between the standard deviation and the average cross-sectional diameters of the pores outlined above can be obtained by dividing the standard deviation by the average and multiplying by 100%.

Yet another advantage of the use of fibril materials in the porous electrodes described herein is that the fibril material can be used to form mechanically robust porous support structures, even when the porous support structures include a high total porosity. Such porous support structures can be useful, for example, in electrochemical cells designed to withstand the application of an anisotropic force during charge and/or discharge. By using highly porous, but mechanically robust electrodes, the electrolyte can access the electrode active material relatively easily (thus improving energy density and specific energy) and the electrode will not collapse or otherwise substantially deform under the applied pressure (thereby retaining the desired pore distribution). In certain embodiments, the porous support structures described herein can have a yield strength of at least about 0.1 MPa, or at least about 1 MPa, or at least about 10 MPa (and/or, in certain embodiments, up to about 20 MPa, or more).

Figure 3:
FIG. 3 is a cross-sectional schematic illustration of an electrode comprising a fibril-containing layer, according to certain embodiments.
Figure 3:
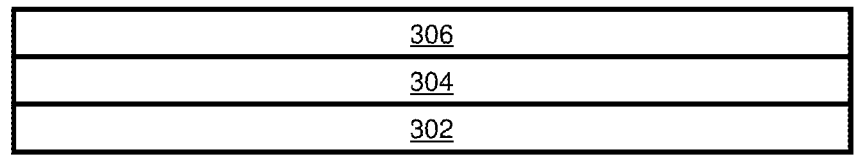

The systems and methods described herein can also be used to form layered electrodes, which can, in certain embodiments, be nonporous (although, in other embodiments, they may be porous). In certain embodiments, the layered electrode comprises an electrochemically active material and a protective layer over the electrochemically active material. In some such embodiments, a fibril material is contained within the protective layer and/or within a fibril-containing layer over the protective layer. FIG. 3 is a cross-sectional schematic illustration, according to one set of embodiments, of layered electrode 300. Electrode 300 comprises layer 302 comprising an electrochemically active material and protective layer 304 over layer 302. Protective layer 304 can comprise fibrils (e.g., cellulosic fibrils), in certain embodiments. While protective layer 304 is illustrated as a single layer in FIG. 3, protective layer 304 can comprise multiple layers, in some embodiments. For example, protective layer 304 can comprise a multi-layer protective structure, as described in more detail below. In some embodiments, protective layer 304 is an ion conducting layer (e.g., a single-ion conducting layer).

In certain embodiments, a fibril-containing layer can be over (e.g., formed over) a protective layer. For example, an electrode can be made by providing a layer of electrochemically active material and a protective layer over the layer of electrochemically active material and positioning a fibril-containing layer adjacent the protective layer.

It should be understood that when a portion (e.g., layer, structure, region) is "on", "adjacent", "above", "over", "overlying", or "supported by" another portion, it can be directly on the portion, or an intervening portion (e.g., layer, structure, region) also may be present. Similarly, when a portion is "below" or "underneath" another portion, it can be directly below the portion, or an intervening portion (e.g., layer, structure, region) also may be present. A portion that is "directly on", "immediately adjacent", "in contact with", or "directly supported by" another portion means that no intervening portion is present. It should also be understood that when a portion is referred to as being "on", "above", "adjacent", "over", "overlying", "in contact with", "below", or "supported by" another portion, it may cover the entire portion or a part of the portion.

Generally, a "protective layer" is a layer of material that protects the electrode active material within the electrode from non-electrochemical chemical reactions or other unfavorable interaction with species within the electrochemical cell. For example, the protective layer can be configured to prevent chemical reaction or other unfavorable interaction between the electrode active material and a species within the electrolyte and/or between the electrode active material and a side product of the electrochemical reaction within the electrochemical cell (e.g., polysulfides in the case of a lithium-sulfur electrochemical cell.

Electrode 300 can comprise, in certain embodiments, an optional fibril-containing layer 306 over protective layer 304. Fibril-containing layers (including any protective layers that may contain fibrils) can be formed via any suitable method. In certain embodiments, a fibril-containing layer can be made by depositing fibrils to form a layer of agglomerated fibrils. In some embodiments, the fibril-containing layer comprises a matrix material having fibrils dispersed therein. The matrix material can comprise, for example, a polymeric material, a ceramic material, or a combination of these and/or other materials.

Fibrils can be incorporated into a ceramic layer using any suitable method. For example, fibrils can be suspended along with a ceramic material in a carrier liquid. The suspension can subsequently be deposited, and the carrier liquid can be removed (e.g., evaporated or otherwise removed). In some embodiments, fibrils can be incorporated into a ceramic layer by making porous layer comprising fibrils and incorporating ceramic into the porous fibril layer. The ceramic material can be incorporated into the porous fibril layer, for example, by vacuum deposition techniques, such as chemical vapor deposition, physical vapor deposition, and the like. The ceramic can be incorporated into the porous fibril layer, in certain embodiments, by introducing a suspension of ceramic precursors into the porous fibril layer, evaporating the liquid component of the suspension, and synthesizing the ceramic at an elevated temperature (e.g., a temperature above which the ceramic melts and below the fibril decomposition temperature).

Fibrils can be incorporated into a polymeric material (e.g., a polymeric protective layer or a separate, fibril-containing polymeric layer) using any suitable method. For example, fibrils can be mixed with the polymeric material used to form the polymeric layer prior to deposition and solidification of the polymer, resulting in fibril material mixed with the finally-formed polymer. A polymeric material can be incorporated into a porous fibril layer, for example, by vacuum deposition techniques, such as chemical vapor deposition, physical vapor deposition, and the like. In certain embodiments, the polymeric material can be incorporated into a porous fibril layer, for example, by introducing a suspension of ceramic precursors into the porous fibril layer, evaporating the liquid component of the suspension, and melting the polymer at an elevated temperature (e.g., a temperature above which the polymer melts and below the fibril decomposition temperature).

In certain embodiments, the fibrils can be substantially evenly dispersed within a protective layer and/or another fibril-containing layer.

Figure 4A:
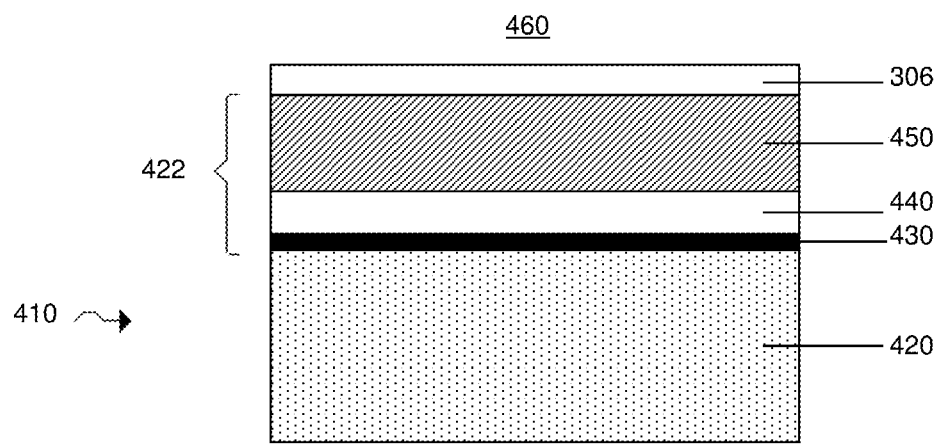
FIGS. 4A-4C are cross-sectional schematic illustrations of electrodes, according to some embodiments.

The electrode active material layer, the protective layer, and the optional fibril-containing layer can be arranged in a variety of ways. For example, FIG. 4A shows one example of an electrode (e.g., a negative electrode) including a multi-layered protective structure (which can contain fibrils) that may be included in an electrochemical cell, such as the electrochemical cell shown in FIG. 1 (e.g., negative electrode 112 of FIG. 1 may be in the form of electrode 410 shown in FIG. 4A). In the embodiment illustrated in FIG. 4A, electrode 410 includes an electrode active material layer 420 (i.e., a layer comprising an electroactive material such as, for example, lithium) and a multi-layered protective structure 422. Generally, the electrode active material layer along with any protective layers and/or fibril-containing layers, and are referred to collectively as the "electrode." All such descriptions are to be understood to form part of the invention. In this particular embodiment, multi-layered protective structure 422 includes an ion-conducting layer 450 (e.g., comprising a single-ion conductive material), a polymeric layer 440 positioned between the electrode active material layer and the ion-conducting layer, and a separation layer 430 (e.g., a layer resulting from plasma treatment of the electrode) positioned between the electrode active layer and the polymeric layer. Multi-layered structures can allow passage of electrochemical ions (e.g., lithium ions) and may impede the passage of other components that may otherwise damage the electrode (e.g., the negative electrode). Advantageously, multi-layered structures can reduce the number of defects and thereby force a substantial amount of the surface of the electrode active material layer to participate in current conduction, impede high current density-induced surface damage, and/or act as an effective barrier to protect the electrode from certain species (e.g., electrolyte and/or polysulfides), as discussed in greater detail below.

An electrode (e.g., a negative electrode), such as that shown in FIG. 4A and in other embodiments described herein, may include an ion conducting layer 450 (e.g., comprising a single-ion conductive material, which can, in certain embodiments, contain fibrils) as part of a multi-layered structure 422. In some embodiments, the ion conducting layer is non-polymeric. In certain embodiments, the ion conducting layer is defined in part or in whole by a metal layer that is highly conductive toward metal ions (e.g., lithium metal ions) and minimally conductive toward electrons. In other words, the ion conducting layer may be one selected to allow metal ions (e.g., lithium ions), but to impede electrons or other ions, from passing across the layer. In some embodiments, the ion conducting layer is defined in part or in whole by a metal layer that is highly conductive toward metal ions (e.g., lithium metal ions) and highly conductive toward electrons (e.g., even more highly conductive toward electrons than ions, in certain embodiments). The metal layer may comprise a metal alloy layer, e.g., a lithiated metal layer especially in the case where a lithium electrode is employed. The lithium content of the metal alloy layer may vary from about 0.5% by weight to about 20% by weight, depending, for example, on the specific choice of metal, the desired lithium ion conductivity, and the desired flexibility of the metal alloy layer. Suitable metals for use in the ion conducting layer (e.g., comprising single-ion conducting material) include, but are not limited to, Al, Zn, Mg, Ag, Pb, Cd, Bi, Ga, In, Ge, Sb, As, and Sn. Sometimes, a combination of metals, such as the ones listed above, may be used in an ion conducting layer.

In other embodiments, the ion conducting layer may include a ceramic layer, for example, a ion conducting glass (e.g., single-ion conducting glass) conductive to metal ions (e.g., lithium ions). Suitable glasses include, but are not limited to, those that may be characterized as containing a "modifier" portion and a "network" portion, as known in the art. The modifier may include a metal oxide of the metal ion conductive in the glass. The network portion may include a metal chalcogenide such as, for example, a metal oxide or sulfide. Ion conducting layers (e.g., single-ion conductive layers) may include glassy layers comprising a glassy material selected from the group consisting of lithium nitrides, lithium silicates, lithium borates, lithium aluminates, lithium phosphates, lithium phosphorus oxynitrides, lithium silicosulfides, lithium germanosulfides, lithium oxides (e.g., $Li_2O$, LiO, $LiO_2$, $LiRO_2$, where R is a rare earth metal), lithium lanthanum oxides, lithium titanium oxides, lithium borosulfides, lithium aluminosulfides, and lithium phosphosulfides, and combinations thereof. In one embodiment, the ion conducting layer comprises a lithium phosphorus oxynitride in the form of an electrolyte.

The thickness of an ion conducting layer (e.g., a single-ion conductive material layer, such as those within a multi-layered structure) may vary, in certain embodiments, over a range from about 1 nm to about 10 microns. For instance, the thickness of the ion conducting layer may be between 1-10 nm thick, between 10-100 nm thick, between 100-1000 nm thick, between 1-5 microns thick, or between 5-10 microns thick. In some embodiments, the thickness of an ion conducting layer may be no greater than, e.g., 10 microns thick, no greater than 5 microns thick, no greater than 1000 nm thick, no greater than 500 nm thick, no greater than 250 nm thick, no greater than 100 nm thick, no greater than 50 nm thick, no greater than 25 nm thick, or no greater than 10 nm thick. In some cases, the ion conducting layer has the same thickness as a polymer layer in a multi-layered structure.

The ion conducting layer may be deposited by any suitable method such as sputtering, electron beam evaporation, vacuum thermal evaporation, laser ablation, chemical vapor deposition (CVD), thermal evaporation, plasma enhanced chemical vacuum deposition (PECVD), laser enhanced chemical vapor deposition, and jet vapor deposition. The technique used may depend on the type of material being deposited, the thickness of the layer, etc.

In some embodiments, ion conducting layers (e.g., single-ion conducting layers) can be treated with a polymer or other material (which can contain fibrils) such that pinholes and/or nanopores of the ion conducting layers may be filled with the polymer. Such composite structures can impede the diffusion of certain species (e.g., electrolyte and/or polysulfides) towards the negative electrode, e.g., by increasing the distance, and tortuosity, through which such a species would need to pass to penetrate the entire multi-layer arrangement to arrive at the negative electrode.

In one embodiment, an ion conducting layer (e.g., single-ion conductive layer) is infiltrated with a monomeric precursor of the transport-inhibiting substance, so that the porous structure is effectively filled with the monomer, the monomer being driven into the nanoporous regions of the porous single-ion conductive layer by the high surface energy present on the single-ion conductive layer's internal surfaces. The ion conducting layer may be treated with an activation process before treatment with the monomer, so that surface energy within the material becomes unusually high, relative to that achievable in normal atmospheric processes.

In some instances, monomer vapor can be condensed onto the ion conducting layer (e.g., single-ion conductive material layer), whereby it is then able to wick along the internal surfaces of the ion conducting layer, until all, or some useful portion of, such available tortuous by-paths of permeation are filled by the monomer. A subsequent curing step, either photo-initiated techniques, plasma treatment, or an electron beam, can then be introduced for polymerization of the infiltrated monomer. The particular cure method utilized will depend on the specific choice of materials and the layer thickness, amongst other variables.

Suitable material used as the transport-inhibiting substance includes material known to fully or partially inhibit (or determined to inhibit through simple screening) transport of a particular unwanted species through the material. As mentioned, material may also be selected according to physical properties, including properties adding flexibility and/or strength to the overall material with which it is combined. Specific examples of materials include, as noted, polymers described herein for use as layers in the multi-layered structure, and/or other polymeric or other species. Where hydrophobicity is desirably added to the overall arrangement, one way to do so is to use an infiltrating transport-inhibiting substance having some degree of hydrophobic character.

Formation of composite ion conducting layer structures (e.g., single-ion conductive structures) may be accomplished by a variety of means; however, in some embodiments, the structure is formed by vacuum vapor deposition methods and apparatus readily available in prior art manufacturing processes. Accordingly, composite structures may be formed utilizing a variety of prior art vapor sources such as sputtering, evaporation, electron-beam evaporation, chemical vapor deposition (CVD), plasma-assisted CVD, etc. The monomer vapor source may similarly be any suitable monomer vapor source of the prior art, including but not limited to flash evaporation, boat evaporation, Vacuum Monomer Technique (VMT), polymer multilayer (PML) techniques, evaporation from a permeable membrane, or any other source found effective for producing a monomer vapor. For example, the monomer vapor may be created from various permeable metal frits, as previously in the art of monomer deposition. Such methods are taught in U.S. Pat. No. 5,536, 323 (Kirlin) and U.S. Pat. No. 5,711,816 (Kirlin), amongst others.

Multi-layered structure 422 can include one or more polymer layers. The thickness of a polymer layer (e.g., within a multi-layered structure) may vary over a range from about 0.1 microns to about 10 microns. For instance, the thickness of the polymer layer may be between 0.1-1 microns thick, between 1-5 microns thick, or between 5-10 microns thick. The thickness of a polymer layer may be no greater than, e.g., 10 microns thick, no greater than 5 microns thick, no greater than 2.5 microns thick, no greater than 1 micron thick, no greater than 0.5 microns thick, or no greater than 0.1 microns thick. In certain embodiments, the polymer layer comprises fibril material, such as a cellulose-based fibril material or other similar material.

In some embodiments including a multi-layered structure having more than one polymer layer, the thicknesses of the polymer layers can vary within the structure. For instance, in some cases, the polymer layer closest to the base electrode material layer (e.g., a Li reservoir) is thicker than the other polymer layers of the structure. This embodiment can, for example, stabilize the negative electrode by allowing lithium ions to plate out more uniformly across the surface of the negative electrode during charge.

In some embodiments, a polymer layer includes a polymer that is conductive to single ions but is also substantially electrically conductive. Examples of such materials include electrically conductive polymers (also known as electronic polymers or conductive polymers) that are doped with lithium salts (e.g., LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, and LiN(SO$_2$CF$_3$)$_2$). Conductive polymers are known in the art; examples of such polymers include, but are not limited to, poly(acetylene)s, poly(pyrrole)s, poly(thiophene)s, poly(aniline)s, poly(fluorene)s, polynaphthalenes, poly(p-phenylene sulfide), and poly(para-phenylene vinylene)s. Electrically-conductive additives may also be added to polymers to form electrically-conductive polymers. Certain electrically conductive materials may have a conductivity of, e.g., greater than $10^{-2}$ S/cm, greater than $10^{-1}$ S/cm, greater than 1 S/cm, greater than $10^1$ S/cm, greater than $10^2$ S/cm, greater than $10^3$ S/cm, greater than $10^4$ S/cm, or greater than $10^5$ S/cm.

In some embodiments, a polymer layer is conductive to one or more types of ions, but is substantially electrically non-conductive. Examples of ion-conductive species that are substantially electrically non-conductive include electrically non-conductive materials (e.g., electrically insulating materials) that are doped with lithium salts. E.g., acrylate, polyethyleneoxide, silicones, polyvinylchlorides, and other insulating polymers that are doped with lithium salts can be ion-conductive but substantially electrically non-conductive.

In some embodiments, ion conducting materials, including single-ion conductive materials, can also include non-polymeric materials. Certain non-electrically conductive materials may have a resistivity of, e.g., greater than $10^3$ ohm-cm, greater than $10^4$ ohm-cm, greater than $10^5$ ohm-cm, greater than $10^6$ ohm-cm, greater than $10^7$ ohm-cm, or greater than $10^8$ ohm-cm.

In some embodiments, suitable polymer layers for use in a multi-layered structure include polymers that are highly conductive towards lithium and minimally conductive towards electrons. Examples of such polymers include ionically conductive polymers, sulfonated polymers, and hydrocarbon polymers. The selection of the polymer will be dependent upon a number of factors including the properties of electrolyte and positive electrode used in the cell. Suitable ionically conductive polymers may include, e.g., ionically conductive polymers known to be useful in solid polymer electrolytes and gel polymer electrolytes for lithium electrochemical cells, such as, for example, polyethylene oxides. Suitable sulfonated polymers may include, e.g., sulfonated siloxane polymers, sulfonated polystyrene-ethylene-butylene polymers, and sulfonated polystyrene polymers. Suitable hydrocarbon polymers may include, e.g., ethylenepropylene polymers, polystyrene polymers, and the like.

Polymer layers of a multi-layered structure can also include crosslinked polymer materials formed from the polymerization of monomers such as alkyl acrylates, glycol acrylates, polyglycol acrylates, polyglycol vinyl ethers, polyglycol divinyl ethers, and those described in U.S. Pat. No. 6,183,901 to Ying et al. of the common assignee for protective coating layers for separator layers. For example, one such crosslinked polymer material is polydivinyl poly (ethylene glycol). The crosslinked polymer materials may further comprise salts, for example, lithium salts, to enhance ionic conductivity. In one embodiment, the polymer layer of the multi-layered structure comprises a crosslinked polymer.

Other classes polymers that may be suitable for use in a polymer layer include, but are not limited to, polyamines (e.g., poly(ethylene imine) and polypropylene imine (PPI)); polyamides (e.g., polyamide (Nylon), poly(ε-caprolactam) (Nylon 6), poly(hexamethylene adipamide) (Nylon 66)), polyimides (e.g., polyimide, polynitrile, and poly(pyromellitimide-1,4-diphenyl ether) (Kapton)); vinyl polymers (e.g., polyacrylamide, poly(2-vinyl pyridine), poly(N-vinylpyrrolidone), poly(methylcyanoacrylate), poly(ethylcyanoacrylate), poly(butylcyanoacrylate), poly(isobutylcyanoacrylate), poly(vinyl acetate), poly (vinyl alcohol), poly(vinyl chloride), poly(vinyl fluoride), poly(2-vinyl pyridine), vinyl polymer, polychlorotrifluoro ethylene, and poly(isohexylcynaoacrylate)); polyacetals; polyolefins (e.g., poly(butene-1), poly(n-pentene-2), polypropylene, polytetrafluoroethylene); polyesters (e.g., polycarbonate, polybutylene terephthalate, polyhydroxybutyrate); polyethers (poly(ethylene oxide) (PEO), poly(propylene oxide) (PPO), poly(tetramethylene oxide) (PTMO)); vinylidene polymers (e.g., polyisobutylene, poly(methyl styrene), poly(methylmethacrylate) (PMMA), poly(vinylidene chloride), and poly(vinylidene fluoride)); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes).

The polymer materials listed above and described herein may further comprise salts, for example, lithium salts (e.g., LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, and LiN(SO$_2$CF$_3$)$_2$), to enhance ionic conductivity.

A polymer layer may be deposited by method such as electron beam evaporation, vacuum thermal evaporation, laser ablation, chemical vapor deposition, thermal evaporation, plasma assisted chemical vacuum deposition, laser enhanced chemical vapor deposition, jet vapor deposition, and extrusion. The polymer layer may also be deposited by spin-coating techniques. A method for depositing crosslinked polymer layers includes flash evaporation methods, for example, as described in U.S. Pat. No. 4,954,371 to Yializis. A method for depositing crosslinked polymer layers comprising lithium salts may include flash evaporation methods, for example, as described in U.S. Pat. No. 5,681, 615 to Affinito et al. The technique used for depositing polymer layers may depend on the type of material being deposited, the thickness of the layer, etc.

As noted in the description with respect to FIG. 4A thus far, in one particular embodiment, the protective structure separating electrode active material layer 420 from electrolyte 460 includes a polymer layer adjacent the electrode active material layer or separation layer 430. In other arrangements, a polymer layer need not be the first layer adjacent the base electrode material layer or separation layer. Various arrangements of layers, including various multi-layered structures, are described below in which the first layer adjacent the base electrode material layer may or may not be polymeric. It is to be understood that in all arrangements where any particular arrangement of layers is shown, alternate ordering of layers is within the scope of the invention. Notwithstanding this, one aspect of the invention includes the particular advantages realized by a non-brittle polymer immediately adjacent the electrode active material layer or separation layer.

In some embodiments, multi-layered structures protect the electrode active material layer better than any individual layer that is included in the structure. For instance, each of the layers of a multi-layered structure (e.g., the ion conducting layers (e.g., single-ion conducting layer), the polymer layers, and/or the separation layer) may possess desirable properties, but at the same time may be most effective when complemented by other components with different properties. For example, ion conducting layers (e.g., single-ion conducting layers), especially vacuum deposited ion conducting layers (e.g., vacuum deposited single-ion conducting layers), may be flexible as thin films, but when deposited as thicker layers, may include defects such as pinholes and/or roughness, and may crack when handled. Polymer layers, and especially crosslinked polymer layers, for example, can provide very smooth surfaces, may add strength and flexibility, and may be electron insulating, but may pass certain solvents and/or liquid electrolytes. Accordingly, these are examples of layers that can complement each other in an overall improved protective structure.

A multi-layered electrode protection structure can act as a superior permeation barrier by decreasing the direct flow of species (e.g., electrolyte and polysulfide species) to the electrode active material layer, since these species have a tendency to diffuse through defects or open spaces in the layers. Consequently, dendrite formation, self discharge, and loss of cycle life can be reduced.

Another advantage of a multi-layered structure includes the mechanical properties of the structure. The positioning of a polymer layer (optionally containing fibrils) adjacent an ion conducting layer (e.g., single-ion conductive layer) can decrease the tendency of the ion conducting layer to crack, and can increase the barrier properties of the structure. Thus, these laminates may be more robust towards stress due to handling during the manufacturing process than structures without intervening polymer layers. In addition, a multi-layered structure can also have an increased tolerance of the volumetric changes that accompany the migration of lithium back and forth from the base electrode material layer during the cycles of discharge and charge of the cell.

The ability of certain species that can be damaging to the electrode active material layer (e.g., electrolytes and/or polysulfides) to reach the electrode active material layer can also be decreased by providing repeated layers of ion conducting layers (e.g., single-ion conductive layers) and polymer layers (optionally containing fibrils) in a multi-layered structure. When a species encounters a defect-free portion of an ion conducting layer, transport of the species towards the electrode active material layer is possible if the species diffuses laterally through a very thin polymer layer to encounter a defect in a second ion conducting layer (e.g., single-ion conductive layer). Since lateral diffusion through ultra-thin layers is very slow, as the number of ion conducting/polymer layer pairs increases, the rate of diffusion of species becomes extremely small (e.g., the amount of penetration across the layer decreases). For instance, in one embodiment, permeation of a species through polymer/ion conducting/polymer 3-layer structures can be reduced by three orders of magnitude over a single ion conducting layer alone (e.g., even though layers alone may have poor bather properties). In another embodiment, a polymer/ion conducting/polymer/ion conducting/polymer 5-layer structure may have more than five orders of magnitude reduction of permeation of a species compared to that in a single ion conducting layer. By contrast, permeation of the same species through a double-thick ion conducting layer may actually increase. These significant reductions in permeation of destructive species through the electrode protective layer can increase as the number of layers increases where the thickness of individual layers decreases. That is, in comparison to a two-layer structure of a ion conducting layer and polymer layer of a particular, overall thickness, a ten-layer structure of alternating ion conducting layers and polymer layers of the same overall thickness can vary significantly decreased permeation of unwanted species through the layer. Because of the significant advantage realized by the electrode stabilization protection structures described herein, overall lower amounts of material can be used in a particular protective structure, as compared to prior art structures. Accordingly, at a particular level of electrode protection needed in a particular battery arrangement, a significantly smaller mass of overall electrode stabilization materials can be employed, significantly reducing overall battery weight.

A multi-layered structure can include various numbers of polymer/ion conducting (e.g., single-ion conductive) pairs as needed. Generally, a multi-layered structure can have n polymer/ion conducting pairs, where n can be determined based on a particular performance criteria for a cell. E.g., n can be an integer equal to or greater than 1, or equal to or greater than 2, 3, 4, 5, 6, 7, 10, 15, 20, 40, 60, 100, or 1000, etc. In some embodiments, a multi-layered structure can include greater than 4, greater than 10, greater than 25, greater than 50, greater than 100, greater than 200, greater than 500, greater than 1000, greater than 2000, greater than 3000, greater than 5000, or greater than 8000 polymer/ion conducting pairs. For example, in one particular embodiment, greater than 10,000 polymer/ion conducting pairs were fabricated.

Figure 4B:
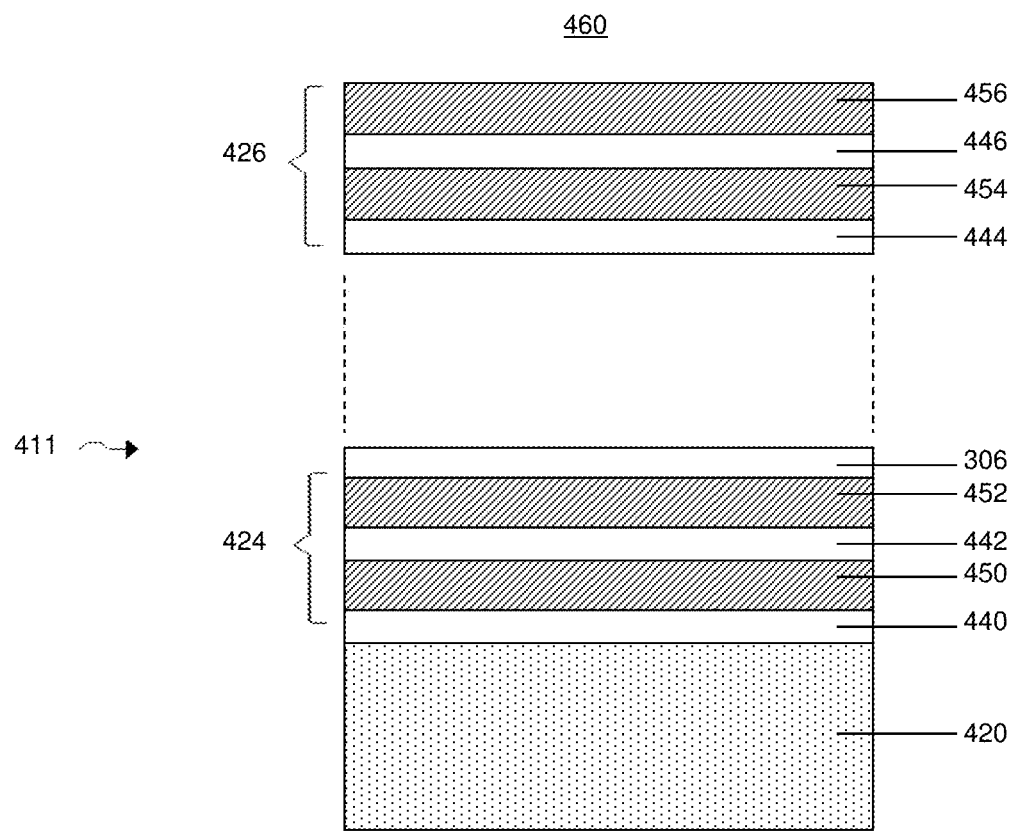

FIG. 4B shows an example of a multi-layered electrode protection structure including multiple polymer and ion conducting (e.g., single-ion conductive) layers (again, any of which may contain fibrils). In the embodiment illustrated in FIG. 4B, negative electrode 411 includes electrode active material layer 420 (e.g., comprising an electroactive material such as lithium), and multi-layered structure 424 positioned between the base electrode material layer and an electrolyte 460 of the cell. The multi-layered structure comprises at least two first layers each of an ion conducting layer (e.g., single-ion conductive material layer) and at least two second layers each of a polymeric material (which can be fibril-containing layers, in certain embodiments). For example, multi-layered structure 424 includes polymer layers 440 and 442 (which can be fibril-containing layers), and ion conducting layers 450 and 452. As shown in FIG. 4B, the two layers of polymeric material and two layers of ion conducting material are arranged in alternating order with respect to each other. Negative electrode 411 may optionally comprise a separation layer (e.g., a plasma treated layer) between the base electrode material layer and the polymeric layer (not shown in FIG. 4B; illustrated in FIG. 4A).

Negative electrode 411 can also include additional multi-layered structures such as multi-layered structure 426, comprising polymer layers 444 and 446 (which can be fibril-containing layers), and ion conducting layers 454 and 456 (which can also be fibril-containing layers, in some embodiments). Multi-layered structures 424 and 426 can be combined to form a single multi-layered structure, or can be constructed together as one, unitary multi-layered structure, including four layers each of an ion conducting material and for layers each of a polymeric material. In other embodiments, structures can include other numbers of alternating ion conducting layers and polymer layers. For instance, a multi-layered structure may include n first layers each of an ion conducting material and n second layers each of a polymeric material, in alternating arrangement, where n is greater than or equal to 2. E.g., n may equal at least 2, 3, 4, 5, 6, or 7, 10, 15, 20, 40, 60, 100, etc.

In other embodiments, a multi-layered structure may include a greater number of polymer layers (one of more of which may contain fibrils) than ion conducting layers (e.g., single-ion conductive layers), or a greater number of ion conducting layers (e.g., single-ion conductive layers) than polymer layers. For example, a multi-layered structure may include a n polymer layers and n+1 ion conducting layers, or n ion conducting layers and n+1 polymer layers, where n is greater than or equal to 2. E.g., n may equal 2, 3, 4, 5, 6, or 7, etc. However, as described above, it is immediately adjacent at least one polymer layer and, in at least 50%, 70%, 90%, or 95% of the ion-conductive layers, such layers are immediately adjacent a polymer layer on either side.

As mentioned, multi-layered electrode protection structures can provide significant advantage where a particular amount of materials defining the structure are arranged in thinner form, and in greater numbers. In some embodiments, each layer of the multi-layered structure has a maximum thickness of less than 100 microns, less than 50 microns, less than 25 microns, less than 10 microns, less than 1 micron, less than 100 nanometers, less than 10 nanometers, or less than 1 nanometer. Sometimes, the thickness of a single type of layer may be the same in a multi-layered structure. For instance, polymer layers 440 and 442 of FIG. 4B may have the same thickness in multi-layered structure 424. In other embodiments, the thickness of a single type of layer may be different in a multi-layered structure, e.g., polymer layers 440 and 442 may have different thicknesses in multi-layered structure 424. The thicknesses of different types of layers in a multi-layered structure may be the same in some cases, or different in other cases. For example, the thicknesses of polymer layers 440 and 442 may be different than the thickness of ion conducting layers 450 and 452. Those of ordinary skill in the art can select appropriate materials and thicknesses of layers in combination with the description herein.

A multi-layered structure may have various overall thicknesses that can depend on, for example, the electrolyte, the opposite electrode, or the particular use of the electrochemical cell. In some cases, a multi-layered structure can have an overall thickness of less than or equal to 1 cm, less than or equal to 5 mm, less than or equal to 1 mm, less than or equal to 700 microns, less than or equal to 300 microns, less than or equal to 250 microns, less than or equal to 200 microns, less than or equal to 150 microns, less than or equal to 100 microns, less than or equal to 75 microns, or less than or equal to 50 microns. It may also be desirable to have a multi-layered structure having a certain thickness with a certain number of polymer/ion conducting material pairs. For instance, in one embodiment, a multi-layered structure may have a thickness of less than 1 mm, and may include greater than 10 polymer/ion conducting material pairs. In another embodiment, a multi-layered structure may have a thickness of less than 0.5 mm, and may include greater than 50 polymer/ion conducting material pairs. It is to be understood that a variety of embodiments may be provided, each including specific combinations of overall electrode stabilization thickness, thicknesses of individual layers, numbers of individual layers, etc. as described herein.

Figure 4C:
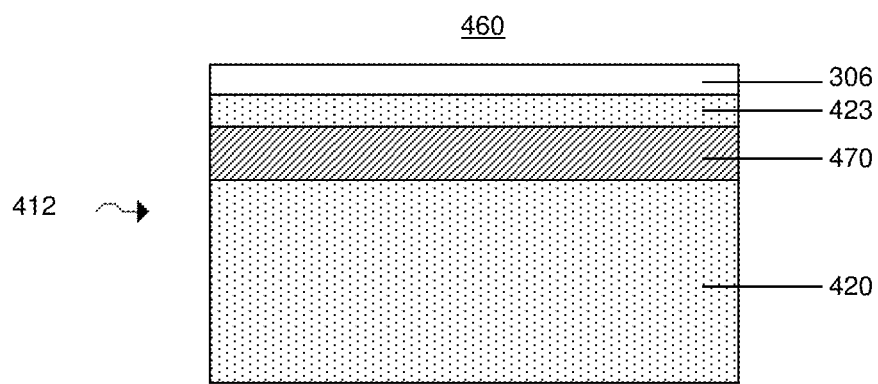

In another set of embodiments, an embedded layer (e.g., of a protective layer such as a ion conducting layer (e.g., a single-ion conductive material layer)) is positioned between two layers of electrode active material. This is referred to as a "lamanode" structure. FIG. 4C shows an exemplary negative electrode 412 including a first layer of electrode active material layer 420 (e.g., lithium, also referred to as a Li reservoir), embedded layer 470, and a second layer 423 comprising the same electrode active material as layer 420 (e.g., a working Li layer). As illustrated in the embodiment shown in FIG. 4C, the second layer is positioned between electrode active material layer 420 and electrolyte 460. The second layer may be either in direct contact with the electrolyte, or in indirect contact with the electrolyte through some form of a surface layer (e.g., an electrode stabilization or multi-layered structure such as one described herein). The function of the bi-layer electrode structure, with each base electrode active material layer separated by an embedded layer 470, will become clearer from the description below. It is noted that although layer 470 is illustrated and described as "embedded" in this description, it is noted that the layer need not be partially or fully embedded. In many or most cases, layer 470 is a substantially thin, two-sided structure coated on each side by base electrode active material, but not covered by base electrode active material at its edges.

In general, in operation of the arrangement shown in FIG. 4C, some or all of second layer 423 of the electrode is "lost" from the electrode upon discharge (when it is converted to lithium ion which moves into the electrolyte). Upon charge, when lithium ion is plated as lithium metal onto the negative electrode, it is plated as portion 423 (or at least some portion of second layer 423) above layer 470. Those of ordinary skill in the art are aware that in electrochemical cells such as those described herein, there is a small amount of overall lithium loss on each charge/discharge cycle of the cell. In the arrangement illustrated in FIG. 4C, the thickness of layer 423 (or the mass of layer 423) can be selected such that most or all of layer 423 is lost upon full discharge of the cell (full "satisfaction" of the opposite electrode; the point at which the opposite electrode can no longer participate in a charging process due to limitations that would be understood by those of ordinary skill in the art).

In certain embodiments, layer 470 is selected to be one that is conductive to metal ions (e.g., lithium ions). The embedded layer can shield the bottom electrode active material layer (e.g., lithium layer) from damage as the high metal ion (e.g., $Li^+$ ion) flux of the first cycle damages the top electrode active material layer surface. Accordingly, once all of layer 423 is consumed in a particular discharge cycle, further discharge results in oxidation of electrode active material (e.g., lithium) from layer 420, passage of metal ion (e.g., lithium ion) through layer 470, and release of metal ion (e.g., lithium ion) into the electrolyte. Of course, layer 423 need not be of a particular mass such that all or nearly all of it is consumed on first discharge. It may take several discharge/charge cycles, and inherent small amount of lithium loss through each cycle, to result in the need to draw electrode active material (e.g., lithium) from layer 420 through layer 470 and into the electrolyte. But once that occurs, then each subsequent charge/discharge cycle will generally progress as follows.

In certain embodiments, through most of a discharge cycle, electrode active material (e.g., lithium) will be removed from layer 423 and, at the very end of the discharge cycle, a small amount of electrode active material (e.g., lithium) may be required to be drawn from section 420 through layer 470 to make up for the amount of electrode active material lost in the most recent charge/discharge cycle. Upon charge, electrode active material (e.g., lithium) may be plated upon layer 470 as material 423 in an amount very slightly less than that removed from the negative electrode during discharge. The embedded layer, which may be an electrode protection layer, can be made of any suitable material selected, by those of ordinary skill in the art, in accordance with the function described herein. Generally, layer 470 will be made of a material that is ion conducting (e.g., single-ion conductive) but that will not allow electrode active material (e.g., lithium metal) itself to pass. In some embodiments the material is electrically non-conductive, for reasons described below.

The ratio of the thickness of first and second layers of electrode active materials (e.g., layers 420 and 423 in FIG. 4C) can be calculated based on, e.g., a required "depth of discharge" (amount of electrode active material consumed) of the first discharge. The ratio may be, for instance, between the range of 0.2 to 0.4. The thickness of negative electrode layer 420 may be, for instance, less than 100 microns, less than 50 microns, less than 25 microns, or less than 10 microns. In some embodiments, negative electrode 20 can have a thickness between 10 and 30 microns.

In some embodiments, embedded layer 470 may have a thickness between 0.01-1 microns, and may depend on, e.g., the type of material used to form the embedded layer and/or the method of depositing the material. For example, the thickness of the embedded layer may be between 0.01-0.1 microns, between 0.1-0.5 microns, or between 0.5-1 micron. In other embodiments, thicker embedded layers are included. For example, the embedded layer can have a thickness between 1-10 microns, between 10-50 microns, or between 50-100 microns. In some cases, the embedded material can be formed of a polymer, e.g., including ones listed above that are lithium ion conductive. The polymer film can be deposited using techniques such as vacuum based PML, VMT or PECVD techniques. In other cases, an embedded layer can comprise a metal or semiconductor material. Metals and semi-conductors can be, for example, sputtered. Those of ordinary skill in the art can choose suitable materials, thicknesses, and methods of depositing embedded layers based on routine experimentation in combination with disclosure herein.

In one embodiment, layer 470 is a negative electrode protection structure of multi-layer form as described herein.

The second layer 423 of electrode active material can be used to protect the surface of electrode active material layer 420 (e.g., a Li surface) by limiting the current density-induced surface damage to a thin (e.g., Li) layer above the embedded layer 470. For instance, layer 423 can lithiate the opposite electrode (be removed from electrode 412 in the form of lithium ion) on the first cycle, e.g., under extremely high $Li^+$ flux, instead of causing electrode active material layer 420 to lithiate the opposite electrode, thereby protecting electrode active material layer 420. In each charge/discharge cycle (after the point is reached at which more lithium than is present in layer 423 is removed from the negative electrode during discharge) only a small amount of lithium may be removed from section 420 and, in some embodiments, no lithium is re-plated at layer 420. This can eliminate or reducing the numbers of defects, cracks, pinholes and/or dendrites forming on the surface of base electrode material layer 420 during the positive electrode lithiation. Electrode 412 can improve the cycle life of the cell compared to a cell including a negative electrode without a second layer of Li and/or an embedded layer, as described in further detail below.

As mentioned, layer 470 should be able to pass electrochemically active ions (e.g., lithium ions). It can be made of material including ceramic, glass, or polymer layer (or a multi-layered structure, as described below) that is conductive to the electrochemically active ions and, in some embodiments, it substantially impedes the passage of electrons across the layer. By "substantially impedes", in this context, it is meant that in this embodiment the material allows electrochemically active ion flux (e.g., lithium ion flux) at least ten times greater than electron passage. As noted, in other embodiments the material can be electron conductive.

A variety of materials and arrangements can be used in individual assemblies described and illustrated herein, or in all of the assemblies. It is to be understood that where a particular component or arrangement is described in connection with one embodiment or figure, that component or arrangement can be used in connection with any others. One example of such a structure is a separation layer, e.g., a temporary protective material layer or a plasma $CO_2$ treatment layer, positioned between an electrode active material layer and a polymer layer or a multi-layered structure. For example, in the embodiment shown in FIG. 4A, layer 430 is a separation layer. It is to be understood that where a separation layer 430 is used, the first layer adjacent the separation layer opposite the electrode active material layer is described herein at times to be adjacent the base electrode material layer. This is because the separation layer is optional. In all instances in which a layer is described as being adjacent, or immediately adjacent an electrode (for example the polymer layer 440 of FIG. 4A), an intervening separation layer can be used but need not be used. Separation layers may improve the compatibility of the base electrode active material layer (e.g., lithium) with layers deposited on top of the base electrode active material layer. For example, when an ion conducting layer (e.g., single-ion conductive layer) is desired at the lithium interface, it can be preferable in certain embodiments to deposit this directly on the lithium surface. However, the precursors to, or components of, such an interfacial layer may react with lithium to produce undesirable by-products or result in undesirable changes in the morphology of the layers. By depositing a separation layer on the lithium surface prior to depositing the interfacial layer such as a multi-layer structure 424 (FIG. 4B), side reactions at the lithium surface may be eliminated or significantly reduced. For example, when an interfacial film of a lithium phosphorus oxynitride, as described in U.S. Pat. No. 5,314,765 to Bates, is deposited in a nitrogen atmosphere by sputtering of $Li_3PO_4$ onto a lithium surface, the nitrogen gas may react with lithium to form lithium nitride ($LiN_3$) at the negative electrode surface. By depositing a layer of a protective material that can be "temporary", e.g., copper over the lithium surface, the interfacial layer may be formed without the formation of lithium nitride. A "temporary" protective layer is one that ceases to be in existence or identifiable after some time after construction of the device, for example after some period of use of the device. For example, a thin layer of copper as a separation layer 430 positioned over a lithium base electrode active material layer 420 may diffuse into an alloy with the lithium base electrode material until, after a particular period of time and/or use of the device, base electrode material layer 420 will be primarily lithium, with a trace of copper, but layer 430 will no longer exist or be identifiable.

A temporary protective material layer may include a material that is capable of forming an alloy with the electrode active material (e.g., lithium metal), or is capable of diffusing into, dissolving into, and/or blending with the electrode active material (e.g., lithium metal), for example, during electrochemical cycling of the cell and/or prior to electrochemical cycling of the cell. The temporary protective material layer can act as a barrier layer to protect the lithium surface during deposition of other layers, such as during the deposition of a multi-layered structure on top of the base electrode active material layer. Further, the temporary protective layer may allow transportation of the lithium films from one processing station to the next without undesirable reactions occurring at the lithium surface during assembly of cells, or for solvent coating of layers onto the base electrode material layer.

The thickness of the temporary protective material layer is selected to provide the necessary protection to the layer comprising lithium, for example, during subsequent treatments to deposit other negative electrode or cell layers. In some embodiments, it is desirable to keep the layer thickness as thin as possible while providing the desired degree of protection so as to not add excess amounts of non-active materials to the cell which would increase the weight of the cell and reduce its energy density. In one embodiment, the thickness of the temporary protective layer is between 5 to 500 nanometers, e.g., between 20 to 200 nanometers, between 50 to 200 nanometers, or between 100 to 150 nanometers.

Suitable materials that may be used as temporary protective material layers include metals such as copper, magnesium, aluminum, silver, gold, lead, cadmium, bismuth, indium, gallium, germanium, zinc, tin, and platinum.

In some cases, separation layer 430 can include plasma treated layers such as $CO_2$ or $SO_2$ induced layers. Plasma treated layers can allow nearly the entire surface area of the base electrode active material layer to participate in the current carrying process. In other words, plasma treated layers may allow uniform current density across a surface and decreases the amount of pitting on a surface. In some cases, these treatments alone routinely increase cycle life by 15% to 35% because more of the electrode active material (e.g., lithium) is available for use during discharge. The plasma surface treatments can make more of the electrode active material (e.g., lithium) available to be cycled by creating a surface that is substantially homogeneous in topography.

In some embodiments, electrodes described herein include an outer layer, e.g., a layer that is in contact with the electrolyte of the cell. This outer layer can be a layer such as layers 422, 424, 426, etc. as shown in the figures, or can be an auxiliary outer layer specifically selected to interface directly with the electrolyte. Outer layers may be selected for properties such as Li-ion conduction, electron conduction, protection of underlying layers which may be unstable to components present in the electrolyte, nonporous to prevent penetration by electrolyte solvents, compatible with electrolyte and the underlying layers, and flexible enough to accommodate for volume changes in the layers observed during discharge and charge. The outer layer should further be stable and preferably insoluble in the electrolyte.

In certain embodiments, the outer layer(s) includes a fibril material, such as a cellulosic fibril material. Examples of other materials suitable for use in the outer layer(s) (alone or in combination with the fibril material) include, but are not limited to, organic or inorganic solid polymer electrolytes, electrically and ionically conducting polymers, and metals with certain lithium solubility properties. In one embodiment, the polymer of the outer layer is selected from the group consisting of electrically conductive polymers, ionically conductive polymers, sulfonated polymers, and hydrocarbon polymers. Further examples of suitable polymers for use in the outer layer of the electrodes described herein are those described in U.S. Pat. No. 6,183,901 to Ying et al.

In embodiments in which the fibril material is incorporated into an electrode, the electrode can be a positive electrode (generally referred to as a cathode during discharge) or a negative electrode (generally referred to as an anode during discharge). For example, in certain embodiments, electrode 200 in FIG. 2 is a positive electrode. In some such embodiments, electrochemically active material 206 comprises sulfur, such as elemental sulfur or other types of sulfur described in more detail below. In some embodiments, electrode 300 in FIG. 3 is a negative electrode. In some such embodiments, electrochemically active material 302 comprises lithium, such as lithium metal (e.g., a lithium foil and/or a lithium thin film) or a lithium metal alloy (e.g., a lithium-tin alloy and/or a lithium aluminum alloy). Such electrodes can be suitable for use, for example, in lithium-sulfur electrochemical cells.

The electrodes and cells described herein may further comprise a substrate, as is known in the art, on or adjacent the surface of a base electrode active material layer opposite that of a multi-layer structure (if present). Substrates are useful as a support on which to deposit the base electrode material, and may provide additional stability for handling of thin (e.g., lithium) film negative electrodes during cell fabrication. Further, in the case of conductive substrates, a substrate may also function as a current collector useful in efficiently collecting the electrical current generated throughout the negative electrode and in providing an efficient surface for attachment of electrical contacts leading to an external circuit. A wide range of substrates are known in the art of electrodes. Suitable substrates include, but are not limited to, those selected from the group consisting of metal foils, polymer films, metallized polymer films, electrically conductive polymer films, polymer films having an electrically conductive coating, electrically conductive polymer films having an electrically conductive metal coating, and polymer films having conductive particles dispersed therein. In one embodiment, the substrate is a metallized polymer film. In other embodiments, the substrate may be selected from electrically non-conductive materials.

The layers of an electrode may be deposited by any of a variety of methods generally known in the art, such as physical or chemical vapor deposition methods, extrusion, and electroplating. Examples of suitable physical or chemical vapor deposition methods include, but are not limited to, thermal evaporation (including, but not limited to, resistive, inductive, radiation, and electron beam heating), sputtering (including, but not limited to, diode, DC magnetron, RF, RF magnetron, pulsed, dual magnetron, AC, MF, and reactive), chemical vapor deposition, plasma enhanced chemical vapor deposition, laser enhanced chemical vapor deposition, ion plating, cathodic arc, jet vapor deposition, and laser ablation. Deposition of the layers may be carried out in a vacuum or inert atmosphere to minimize side reactions in the deposited layers which could introduce impurities into the layers or which may affect the desired morphology of the layers. In some embodiments, electrode active layers and the layers of multi-layered structures are deposited in a continuous fashion in a multistage deposition apparatus.

Specifically, methods for depositing an electroactive material such as lithium onto a substrate include methods such as thermal evaporation, sputtering, jet vapor deposition, and laser ablation. Alternatively, where the electrode comprises a lithium foil, or a lithium foil and a substrate, these can be laminated together by a lamination process as known in the art, to form a negative electrode layer.

In certain embodiments, the electrochemical cell comprises an electrolyte in electrochemical communication with the negative electrode and the positive electrode, such as electrolyte 114 in FIG. 1. The electrolyte comprises, in certain embodiments, a plurality of fibrils. In some embodiments, the electrolyte comprises a solid material, and the fibrils are at least partially surrounded by the solid material. For example, the fibrils can be at least partially surrounded by an electronically insulating separator, a gel electrolyte, and/or an ionically conductive solid polymer electrolyte.

The solid material within the electrolyte that at least partially surrounds the fibril material can itself be ionically conductive, in certain embodiments. For example, in certain embodiments, the electrolyte comprises an ionically conductive solid material (e.g., an ionically conductive solid polymeric material) that at least partially surrounds the fibrils. In some embodiments, the electrolyte comprises an ionically conductive gel that at least partially surrounds the fibrils. In some embodiments, the solid material within the electrolyte that at least partially surrounds the fibril material can itself be ionically non-conductive. For example, the solid material that at least partially surrounds the fibril material can comprise an ionically (and electronically) non-conductive separator, such as an insulating porous separator. In some such embodiments, the electrolyte can comprise an ionically conductive liquid that fills the pores of the ionically non-conductive separator to impart sufficient ionic conductivity for the electrolyte to function.

Fibrils can be incorporated into an electrolyte material using any suitable method. For example, fibrils can be mixed with the polymeric material used to form the electrolyte (e.g., a solid polymer electrolyte or a gel electrolyte) or a portion thereof (e.g., a separator) prior to solidification of the polymer, resulting in fibril material mixed with the finally-formed polymer. As one specific example, fibrils can be mixed with polymeric material used to form a solid polymer electrolyte prior to solidification of the polymer, and after the polymer is solidified, the fibrils can be at least partially surrounded by the solid polymer. As another example, fibrils can be mixed with a gel material precursor prior to solidification, and after formation of the gel (e.g., via polymerization and/or cross-linking), the fibrils can be at least partially surrounded by the gel. In certain embodiments, the fibrils can be substantially evenly dispersed throughout the solid portion of the electrolyte. In certain embodiments, the fibrils can be substantially completely surrounded by the solid portion of the electrolyte.

In certain embodiments, the electrochemical cells described herein (and/or the electrodes or other components described here) can be configured to be operated while an anisotropic force is applied to the electrochemical cell. Accordingly, in certain embodiments, the electrochemical cells and cell components described herein can be configured to withstand an applied anisotropic force (e.g., a force applied to enhance the morphology of an electrode) while maintaining their structural integrity, void volume, pore size, electrical and/or ionic insulating properties, or any other of the properties described herein.

In certain embodiments, the electrodes and/or other cell components described herein can be part of (or can be configured to be a part of) an electrochemical cell that is constructed and arranged to apply, during at least one period of time during charge and/or discharge of the cell, an anisotropic force with a component normal to the active surface of an electrode within the electrochemical cell (e.g., a negative electrode comprising lithium metal and/or a lithium alloy). In one set of embodiments, the applied force can be selected to enhance the morphology of an electrode (e.g., a negative electrode such as a lithium metal and/or alloy negative electrode), and the other electrode (e.g., positive electrode) can be porous. In some such embodiments, at least one electrode, the electrolyte, or any other component of the cell can contain a plurality of fibrils. The fibrils can, in certain embodiments, be configured to enhance the degree to which the electrode(s), electrolyte, and/or other component withstands the application of the anisotropic force without losing one or more structural properties.

An "anisotropic force" is given its ordinary meaning in the art and means a force that is not equal in all directions. A force equal in all directions is, for example, internal pressure of a fluid or material within the fluid or material, such as internal gas pressure of an object. Examples of forces not equal in all directions include forces directed in a particular direction, such as the force on a table applied by an object on the table via gravity. Another example of an anisotropic force includes certain forces applied by a band arranged around a perimeter of an object. For example, a rubber band or turnbuckle can apply forces around a perimeter of an object around which it is wrapped. However, the band may not apply any direct force on any part of the exterior surface of the object not in contact with the band. In addition, when the band is expanded along a first axis to a greater extent than a second axis, the band can apply a larger force in the direction parallel to the first axis than the force applied parallel to the second axis.

In certain embodiments, the anisotropic force comprises a component normal to an active surface of an electrode within an electrochemical cell. As used herein, the term "active surface" is used to describe a surface of an electrode that is in physical contact with the electrolyte and at which electrochemical reactions may take place. For example, referring back to FIG. 1, positive electrode 110 can include positive electrode active surface 118 and/or negative electrode 112 can include negative electrode active surface 120. One of ordinary skill in the art would understand that an active surface of an electrode refers to a geometric surface of the electrode, which will be understood by those of ordinary skill in the art to refer to a surface defined by the outer boundaries of the electrode, for example, the area that may be measured by a macroscopic measuring tool (e.g., a ruler), and does not include the internal surface area (e.g., area within pores of a porous electrode).

A force with a "component normal" to a surface is given its ordinary meaning as would be understood by those of ordinary skill in the art and includes, for example, a force which at least in part exerts itself in a direction substantially perpendicular to the surface. For example, in the case of a horizontal table with an object resting on the table and affected only by gravity, the object exerts a force essentially completely normal to the surface of the table. If the object is also urged laterally across the horizontal table surface, then it exerts a force on the table which, while not completely perpendicular to the horizontal surface, includes a component normal to the table surface. Those of ordinary skill can understand other examples of these terms, especially as applied within the description of this document. An applied force with a component normal to an active surface of an electrode is illustrated in FIG. 1. In FIG. 1, an anisotropic force may be applied in the direction of arrow 150. Arrow 151 illustrates the component of force 150 that is normal to active surface 120 of negative electrode 112 (and also, in this case, normal to active surface 118 of positive electrode 110). In the case of a curved surface (for example, a concave surface or a convex surface), the component of the anisotropic force that is normal to an active surface of an electrode may correspond to the component normal to a plane that is tangent to the curved surface at the point at which the anisotropic force is applied. The anisotropic force may be applied, in some cases, at one or more pre-determined locations, optionally distributed over the active surface of the electrode (e.g., the negative electrode). In some embodiments, the anisotropic force is applied uniformly over the active surface of the electrode (e.g., the negative electrode).

Any of the electrode properties (e.g., porosities, pore size distributions, etc.) and/or performance metrics described herein may be achieved, alone or in combination with each other, while an anisotropic force is applied to the electrochemical cell (e.g., during charge and/or discharge of the cell). In certain embodiments, the anisotropic force applied to an electrode and/or to an electrochemical cell containing the electrode (e.g., during at least one period of time during charge and/or discharge of the cell) can include a component normal to an active surface of an electrode (e.g., a negative electrode such as a lithium metal and/or lithium alloy electrode within the electrochemical cell and/or the porous electrode comprising multiple porous support structures). In certain embodiments, the component of the anisotropic force that is normal to the active surface of the electrode defines a pressure of at least about 20, at least about 25, at least about 35, at least about 40, at least about 50, at least about 75, at least about 90, at least about 100, at least about 125 or at least about 150 Newtons per square centimeter, while the desired electrode properties are present. In certain embodiments, the component of the anisotropic force normal to the active surface may, for example, define a pressure of less than about 200, less than about 190, less than about 175, less than about 150, less than about 125, less than about 115, or less than about 110 Newtons per square centimeter, while the desired electrode properties are present. While forces and pressures are generally described herein in units of Newtons and Newtons per unit area, respectively, forces and pressures can also be expressed in units of kilograms-force and kilograms-force per unit area, respectively. One of ordinary skill in the art will be familiar with kilogram-force-based units, and will understand that 1 kilogram-force is equivalent to about 9.8 Newtons.

The anisotropic forces described herein may be applied using any method known in the art. In some embodiments, the force may be applied using compression springs. Forces may be applied using other elements (either inside or outside a containment structure) including, but not limited to Belleville washers, machine screws, pneumatic devices, and/or weights, among others. In some cases, cells may be pre-compressed before they are inserted into containment structures, and, upon being inserted to the containment structure, they may expand to produce a net force on the cell. Suitable methods for applying such forces are described in detail, for example, in U.S. patent application Ser. No. 12/535,328, filed Aug. 4, 2009, entitled "Application of Force in Electrochemical Cells" to Scordilis-Kelley et al. which is incorporated herein by reference in its entirety.

The electrodes described herein can include any suitable electrode active material. As used herein, the term "electrode active material" refers to any electrochemically active species associated with an electrode. For example, a "positive electrode active material" refers to any electrochemically active species associated with the positive electrode, while a "negative electrode active material" refers to any electrochemically active species associated with a negative electrode.

In certain embodiments, the electrode active material within an electrode (e.g., within a positive electrode) can comprise sulfur. For example, the electrode active material within a porous electrode (e.g., electrode active material 206 in FIG. 2) can comprise electroactive sulfur-containing materials. "Electroactive sulfur-containing materials," as used herein, refers to electrode active materials which comprise the element sulfur in any form, wherein the electrochemical activity involves the oxidation or reduction of sulfur atoms or moieties. As an example, the electroactive sulfur-containing material may comprise elemental sulfur (e.g., $S_8$). In some embodiments, the electroactive sulfur-containing material comprises a mixture of elemental sulfur and a sulfur-containing polymer. Thus, suitable electroactive sulfur-containing materials may include, but are not limited to, elemental sulfur, sulfides or polysulfides (e.g., of alkali metals) which may be organic or inorganic, and organic materials comprising sulfur atoms and carbon atoms, which may or may not be polymeric. Suitable organic materials include, but are not limited to, those further comprising heteroatoms, conductive polymer segments, composites, and conductive polymers. In some embodiments, an electroactive sulfur-containing material within an electrode (e.g., a positive electrode) comprises at least about 40 wt % sulfur. In some cases, the electroactive sulfur-containing material comprises at least about 50 wt %, at least about 75 wt %, or at least about 90 wt % sulfur.

Examples of sulfur-containing polymers include those described in: U.S. Pat. Nos. 5,601,947 and 5,690,702 to Skotheim et al.; U.S. Pat. Nos. 5,529,860 and 6,117,590 to Skotheim et al.; U.S. Pat. No. 6,201,100 issued Mar. 13, 2001, to Gorkovenko et al., and PCT Publication No. WO 99/33130. Other suitable electroactive sulfur-containing materials comprising polysulfide linkages are described in U.S. Pat. No. 5,441,831 to Skotheim et al.; U.S. Pat. No. 4,664,991 to Perichaud et al., and in U.S. Pat. Nos. 5,723,230, 5,783,330, 5,792,575 and 5,882,819 to Naoi et al. Still further examples of electroactive sulfur-containing materials include those comprising disulfide groups as described, for example in, U.S. Pat. No. 4,739,018 to Armand et al.; U.S. Pat. Nos. 4,833,048 and 4,917,974, both to De Jonghe et al.; U.S. Pat. Nos. 5,162,175 and 5,516,598, both to Visco et al.; and U.S. Pat. No. 5,324,599 to Oyama et al.

While sulfur, as an electrode active species in the porous electrode (e.g., a porous positive electrode), is described predominately, it is to be understood that wherever sulfur is described as a component of the electrode active material within a porous electrode herein, any suitable electrode active species may be used. For example, in certain embodiments, the electrode active species within a porous electrode (e.g., a porous positive electrode) can comprise a hydrogen-absorbing alloy, such as those commonly used in nickel metal hydride batteries. One of ordinary skill in the art, given the present disclosure, would be capable of extending the ideas described herein to electrochemical cells containing electrodes employing other active materials within porous electrodes (e.g., positive or negative porous electrodes).

In certain embodiments, the electrode active material within an electrode (e.g., a negative electrode) comprises lithium. For example, electrode active material layer 302 and/or electrode active material layer 420 can comprise lithium, in certain embodiments. Suitable electrode active materials comprising lithium include, but are not limited to, lithium metal such as lithium foil and lithium deposited onto a conductive substrate, and lithium metal alloys (e.g., lithium-aluminum alloys and lithium-tin alloys). In some embodiments, the electrode active lithium-containing material of an electrode active layer comprises greater than 50 wt % lithium. In some cases, the electrode active lithium-containing material of an electrode active layer comprises greater than 75 wt % lithium. In still other embodiments, the electrode active lithium-containing material of an electrode active layer comprises greater than 90 wt % lithium. Other examples of electrode active materials that can be used (e.g., in the negative electrode) include, but are not limited to, other alkali metals (e.g., sodium, potassium, rubidium, caesium, francium), alkaline earth metals (e.g., beryllium, magnesium, calcium, strontium, barium, radium), and the like.

The electrolytes described herein can comprise any material capable of separating or insulating the positive and negative electrodes from each other to prevent short circuiting, while being constructed and arranged to permit the transport of ions between the positive and negative electrodes. In some embodiments, all or part of the electrolyte can be formed of a material with a bulk electronic resistivity of at least about $10^4$, at least about $10^5$, at least about $10^{10}$ at least about $10^{15}$, or at least about $10^{20}$ Ohm-meters.

As noted elsewhere, the electrolyte may, in certain embodiments, contain fibrils, although electrolytes that do not contain fibrils may also be employed (e.g., in embodiments in which fibrils are contained elsewhere in the electrochemical cell, such as in the positive electrode or in the negative electrode).

The electrolyte can be a solid electrolyte, in some embodiments, optionally containing fibrils. In addition to electrically insulating the negative electrode from the positive electrode, the solid electrolyte can be ionically conductive, thereby allowing for the transfer of ions between the negative electrode and the positive electrode. Examples of useful solid polymer electrolytes include, but are not limited to, those comprising one or more polymers selected from the group consisting of polyethers, polyethylene oxides, polypropylene oxides, polyimides, polyphosphazenes, polyacrylonitriles, polysiloxanes, derivatives of the foregoing, copolymers of the foregoing, crosslinked and network structures of the foregoing, and blends of the foregoing.

In some embodiments, all or part of the electrolyte can be formed of a gel, optionally containing fibrils. As used herein, the term "gel" refers to a three-dimensional network comprising a liquid and a binder component, in which the liquid is entrained by and not allowed to flow through the binder. Gels can be formed when liquids are entrained within a three-dimensional network of solids upon applying the liquid to the solid network. In some cases, the three-dimensional network within a gel can comprise a liquid entrained within a polymer (e.g., a cross-linked polymer). One of ordinary skill in the art would be capable of determining the difference between a gel and other combinations of a solid and a fluid (e.g., a porous separator and a liquid solvent) by measuring, for example, the absorption stiffness of the gel via a dibutyl phthalate (DBP) uptake test. Generally, upon exposure of the binder component of a gel to a liquid, the weight of the gel will increase, while the weight of a porous separator will not substantially increase. In some embodiments, the binder component of the gel is able to take up liquid in the substantial absence of pores greater than about 10 microns or greater than about 1 micron. The binder component of a gel can be substantially free of pores in some cases. Examples of useful gel polymers for use in the electrolyte include, but are not limited to, those comprising one or more polymers selected from the group consisting of polyethylene oxides, polypropylene oxides, polyacrylonitriles, polysiloxanes, polyimides, polyphosphazenes, polyethers, sulfonated polyimides, perfluorinated membranes (NAFION resins), polydivinyl polyethylene glycols, polyethylene glycol diacrylates, polyethylene glycol dimethacrylates, derivatives of the foregoing, copolymers of the foregoing, crosslinked and network structures of the foregoing, and blends of the foregoing, and optionally, one or more plasticizers.

In some embodiments, the electrolyte comprises a solid, electrically non-conductive separator material that is partially or substantially filled with a liquid electrolyte, the solid material optionally containing fibrils. The solid, electrically non-conductive material can, in some embodiments, be substantially ionically non-conductive. In other cases, the solid, electrically non-conductive might be ionically conductive, and the liquid electrolyte can be used to produce a combined structure with an enhanced ionic conductivity (relative to that of the solid portion of the combination).

A variety of solid, electrically non-conductive separator materials are known in the art. Examples of suitable solid porous separator materials include, but are not limited to, polyolefins, such as, for example, polyethylenes and polypropylenes, glass fiber filter papers, and ceramic materials. Further examples of separators and separator materials suitable for use in this invention are those comprising a microporous xerogel layer, for example, a microporous pseudo-boehmite layer, which may be provided either as a free standing film or by a direct coating application on one of the electrodes, as described in U.S. patent application Ser. Nos. 08/995,089 and 09/215,112 by Carlson et al. of the common assignee. Solid electrolytes and gel electrolytes may also function as a separator in addition to their electrolyte function.

As noted above, a liquid can be incorporated within the electrolyte to enhance ionic conductivity. In some embodiments, the liquid electrolyte can include one or more ionic electrolyte salts to increase the ionic conductivity. Examples of ionic electrolyte salts for use in the electrolytes described herein include, but are not limited to, LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, and LiN(SO$_2$CF$_3$)$_2$. Other electrolyte salts that may be useful include lithium polysulfides (Li$_2$S$_x$), and lithium salts of organic ionic polysulfides (LiS$_x$R)$_n$, where x is an integer from 1 to 20, n is an integer from 1 to 3, and R is an organic group, and those disclosed in U.S. Pat. No. 5,538,812 to Lee et al. A range of concentrations of the ionic lithium salts in the solvent may be used such as from about 0.2 m to about 2.0 m (m is moles/kg of solvent). In some embodiments, a concentration in the range between about 0.5 m to about 1.5 m is used. The addition of ionic lithium salts to the solvent is optional in that upon discharge of Li/S cells the lithium sulfides or polysulfides formed typically provide ionic conductivity to the electrolyte, which may make the addition of ionic lithium salts unnecessary. Furthermore, if an ionic N—O additive such as an inorganic nitrate, organic nitrate, or inorganic nitrite is used, it may provide ionic conductivity to the electrolyte in which case no additional ionic lithium electrolyte salts may be needed.

In one set of embodiments a non-aqueous-based electrolyte is used; in another set of embodiments, an aqueous-based electrolyte is used. Examples of useful non-aqueous liquid electrolyte solvents include, but are not limited to, non-aqueous organic solvents, such as, for example, N-methyl acetamide, acetonitrile, acetals, ketals, esters, carbonates, sulfones, sulfites, sulfolanes, aliphatic ethers, acyclic ethers, cyclic ethers, glymes, polyethers, phosphate esters, siloxanes, dioxolanes, N-alkylpyrrolidones, substituted forms of the foregoing, and blends thereof. Examples of acyclic ethers that may be used include, but are not limited to, diethyl ether, dipropyl ether, dibutyl ether, dimethoxymethane, trimethoxymethane, dimethoxyethane, diethoxyethane, 1,2-dimethoxypropane, and 1,3-dimethoxypropane. Examples of cyclic ethers that may be used include, but are not limited to, tetrahydrofuran, tetrahydropyran, 2-methyltetrahydrofuran, 1,4-dioxane, 1,3-dioxolane, and trioxane. Examples of polyethers that may be used include, but are not limited to, diethylene glycol dimethyl ether (diglyme), triethylene glycol dimethyl ether (triglyme), tetraethylene glycol dimethyl ether (tetraglyme), higher glymes, ethylene glycol divinylether, diethylene glycol divinylether, triethylene glycol divinylether, dipropylene glycol dimethyl ether, and butylene glycol ethers. Examples of sulfones that may be used include, but are not limited to, sulfolane, 3-methyl sulfolane, and 3-sulfolene. Fluorinated derivatives of the foregoing are also useful as liquid electrolyte solvents. Mixtures of the solvents described herein can also be used.

In some embodiments, specific liquid electrolyte solvents that may be favorable towards a lithium negative electrode (e.g., have relatively low reactivity towards lithium, good lithium ion conductivity, and/or relatively low polysulfide solubility) include, but are not limited to 1,1-dimethoxyethane (1,1-DME), 1,1-diethoxyethane, 1,2-diethoxyethane, diethoxymethane, dibutyl ether, anisole or methoxybenzene, veratrole or 1,2-dimethoxybenzene, 1,3-dimethoxybenzene, t-butoxyethoxyethane, 2,5-dimethoxytetrahydrofurane, cyclopentanone ethylene ketal, and combinations thereof.

Specific liquid electrolyte solvents that may be favorable towards the positive electrode (e.g., have relatively high polysulfide solubility, and/or can enable high rate capability and/or high sulfur utilization) include, but are not limited to dimethoxyethane (DME, 1,2-dimethoxyethane) or glyme, diglyme, triglyme, tetraglyme, polyglymes, sulfolane, 1,3-dioxolane (DOL), tetrahydrofurane (THF), acetonirile, and combinations thereof.

Specific mixtures of solvents include, but are not limited to 1,3-dioxolane and dimethoxyethane, 1,3-dioxolane and diethyleneglycol dimethyl ether, 1,3-dioxolane and triethyleneglycol dimethyl ether, and 1,3-dioxolane and sulfolane. The weight ratio of the two solvents in the mixtures may vary from about 5 to 95 to 95 to 5. In some embodiments, a solvent mixture comprises dioxolanes (e.g., greater than 40% by weight of dioxolanes).

In some cases, aqueous solvents can be used as electrolytes for lithium cells. Aqueous solvents can include water, which can contain other components such as ionic salts. In some embodiments, the electrolyte can include species such as lithium hydroxide, or other species rendering the electrolyte basic, so as to reduce the concentration of hydrogen ions in the electrolyte.

In some cases, the electrically non-conductive material layer positioned between a negative electrode and a positive electrode can function to screen the negative electrode (e.g., a base electrode layer of the negative electrode) from any positive electrode roughness under an applied force or pressure, keeping the negative electrode surface smooth under force or pressure, and stabilizing any multi-layered structures of the negative electrode (e.g., ceramic polymer multi-layer) by keeping the multi-layer pressed between the base electrode layer and the smooth polymer layer. In some such embodiments, the polymer layer may be chosen to be compliant and have a smooth surface. In certain embodiments, addition of a fibril material (such as a fibril material comprising cellulose or a cellulose derivative) can allow one to produce a very smooth layer between a cathode and an anonde (e.g., a separator, a solid electrolyte, etc.).

The electrochemical cells, electrodes, and other components and devices described herein can be used in a variety of devices, such as, for example, electric vehicles, load-leveling devices (e.g., for solar- or wind-based energy platforms), portable electronic devices, and the like.

The following documents are incorporated herein by reference in their entireties for all purposes: U.S. Pat. No. 7,247,408, filed May 23, 2001, entitled "Lithium Anodes for Electrochemical Cells"; U.S. Pat. No. 5,648,187, filed Mar. 19, 1996, entitled "Stabilized Anode for Lithium-Polymer Batteries"; U.S. Pat. No. 5,961,672, filed Jul. 7, 1997, entitled "Stabilized Anode for Lithium-Polymer Batteries"; U.S. Pat. No. 5,919,587, filed May 21, 1997, entitled "Novel Composite Cathodes, Electrochemical Cells Comprising Novel Composite Cathodes, and Processes for Fabricating Same"; U.S. patent application Ser. No. 11/400,781, filed Apr. 6, 2006, published as U.S. Pub. No. 2007-0221265, and entitled "Rechargeable Lithium/Water, Lithium/Air Batteries"; International Patent Apl. Serial No. PCT/US2008/009158, filed Jul. 29, 2008, published as International Pub. No. WO/2009017726, and entitled "Swelling Inhibition in Lithium Batteries"; U.S. patent application Ser. No. 12/312,764, filed May 26, 2009, published as U.S. Pub. No. 2010-0129699, and entitled "Separation of Electrolytes"; International Patent Apl. Serial No. PCT/US2008/012042, filed Oct. 23, 2008, published as International Pub. No. WO/2009054987, and entitled "Primer for Battery Electrode"; U.S. patent application Ser. No. 12/069,335, filed Feb. 8, 2008, published as U.S. Pub. No. 2009-0200986, and entitled "Protective Circuit for Energy-Storage Device"; U.S. patent application Ser. No. 11/400,025, filed Apr. 6, 2006, published as U.S. Pub. No. 2007-0224502, and entitled "Electrode Protection in both Aqueous and Non-Aqueous Electrochemical Cells, including Rechargeable Lithium Batteries"; U.S. patent application Ser. No. 11/821,576, filed Jun. 22, 2007, published as U.S. Pub. No. 2008/0318128, and entitled "Lithium Alloy/Sulfur Batteries"; patent application Ser. No. 11/111,262, filed Apr. 20, 2005, published as U.S. Pub. No. 2006-0238203, and entitled "Lithium Sulfur Rechargeable Battery Fuel Gauge Systems and Methods"; U.S. patent application Ser. No. 11/728,197, filed Mar. 23, 2007, published as U.S. Pub. No. 2008-0187663, and entitled "Co-Flash Evaporation of Polymerizable Monomers and Non-Polymerizable Carrier Solvent/Salt Mixtures/Solutions"; International Patent Apl. Serial No. PCT/US2008/010894, filed Sep. 19, 2008, published as International Pub. No. WO/2009042071, and entitled "Electrolyte Additives for Lithium Batteries and Related Methods"; International Patent Apl. Serial No. PCT/US2009/000090, filed Jan. 8, 2009, published as International Pub. No. WO/2009/089018, and entitled "Porous Electrodes and Associated Methods"; U.S. patent application Ser. No. 12/535,328, filed Aug. 4, 2009, published as U.S. Pub. No. 2010/0035128, and entitled "Application of Force In Electrochemical Cells"; U.S. patent application Ser. No. 12/727,862, filed Mar. 19, 2010, entitled "Cathode for Lithium Battery"; U.S. patent application Ser. No. 12/471,095, filed May 22, 2009, now U.S. Pat. No. 8,087,309, entitled "Hermetic Sample Holder and Method for Performing Microanalysis Under Controlled Atmosphere Environment"; U.S. patent application Ser. No. 12/862,513, filed on Aug. 24, 2010, published as U.S. Patent Publication No. 2011/0068001, entitled "Release System for Electrochemical cells" (which claims priority to Provisional Patent Apl. Ser. No. 61/236,322, filed Aug. 24, 2009, entitled "Release System for Electrochemical Cells"); U.S. patent application Ser. No. 13/216,559, filed on Aug. 24, 2011, published as U.S. Patent Publication No. 2012/0048729, entitled "Electrically Non-Conductive Materials for Electrochemical Cells;" U.S. patent application Ser. No. 12/862,528, filed on Aug. 24, 2010, published as U.S. Patent Publication No. 2011/0177398, entitled "Electrochemical Cell"; U.S. patent application Ser. No. 12/862,563, filed on Aug. 24, 2010, published as U.S. Patent Pub. No. 2011/0070494, entitled "Electrochemical Cells Comprising Porous Structures Comprising Sulfur"; U.S. patent application Ser. No. 12/862,551, filed on Aug. 24, 2010, published as U.S. Patent Pub. No. 2011/0070491, entitled "Electrochemical Cells Comprising Porous Structures Comprising Sulfur"; U.S. patent application Ser. No. 12/862,576, filed on Aug. 24, 2010, published as U.S. Patent Pub. No. 2011/0059361, entitled "Electrochemical Cells Comprising Porous Structures Comprising Sulfur"; U.S. patent application Ser. No. 12/862,581, filed on Aug. 24, 2010, published as U.S. Patent Pub. No. 2011/0076560, entitled "Electrochemical Cells Comprising Porous Structures Comprising Sulfur"; U.S. patent application Ser. No. 13/240,113, filed on Sep. 22, 2011, published as U.S. Patent Pub. No. 2012/0070746, entitled "Low Electrolyte Electrochemical Cells"; and U.S. patent application Ser. No. 13/033,419, filed Feb. 23, 2011, published as U.S. Patent Pub. No. 2011/0206992, entitled "Porous Structures for Energy Storage Devices". U.S. Provisional Patent Application Ser. No. 61/772,627, filed Mar. 5, 2013, and entitled "Electrochemical Cells Comprising Fibril Materials, Such as Fibril Cellulose Materials" is also incorporated herein by reference in its entirety for all purposes. All other patents and patent applications disclosed herein are also incorporated by reference in their entirety for all purposes.

The following examples are intended to illustrate certain embodiments of the present invention, but do not exemplify the full scope of the invention.

Example 1

Figure 5:
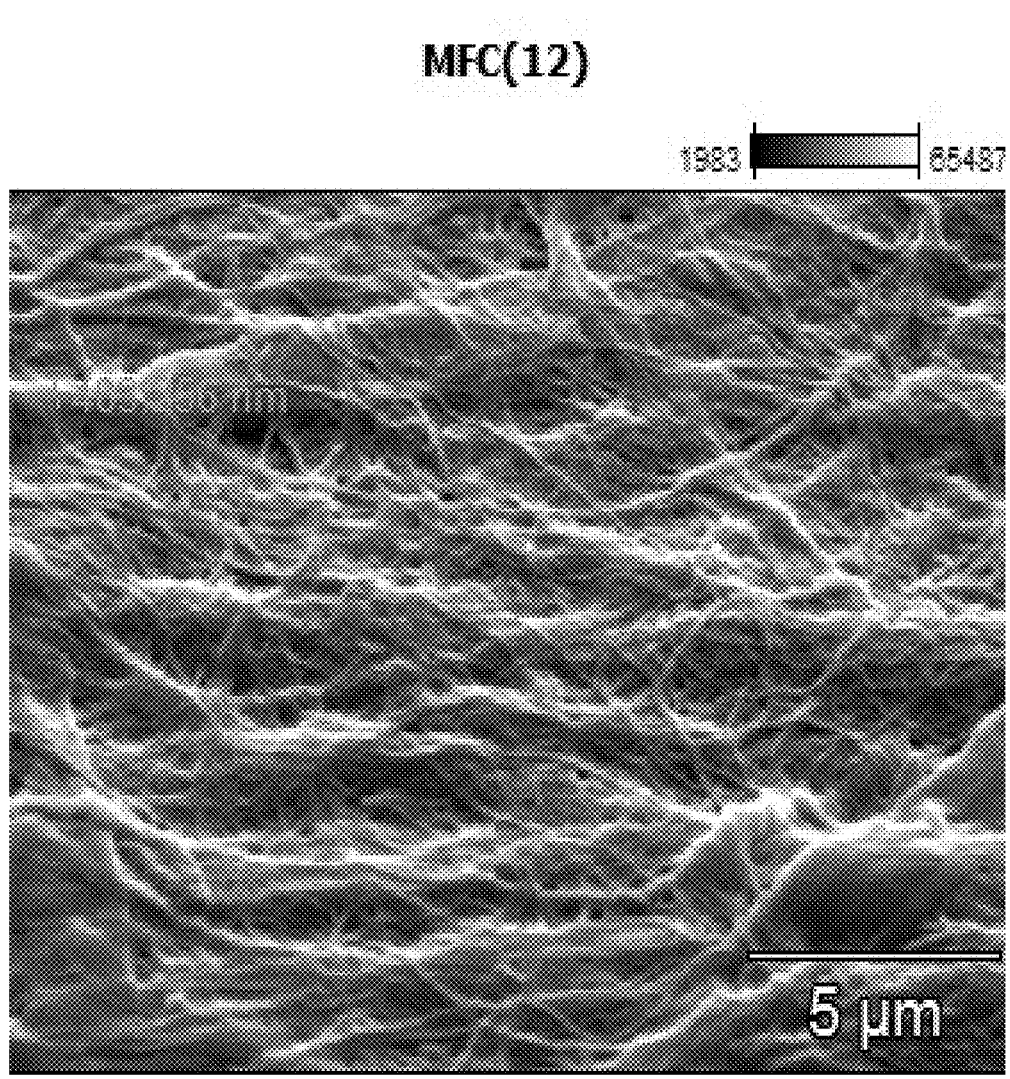
FIG. 5 is a scanning electron micrograph (SEM) image of cellulose fibrils, according to one embodiment.

This example describes the benefit of incorporating cellulose fibrils into electrochemical cells. A scanning electron micrograph image of the cellulose fibrils used in this example (as coated on aluminum foil and dried, to remove the water) is shown in FIG. 5. As shown in FIG. 5, the fibrils had maximum cross-sectional diameters of less than 1 micrometer and aspect ratios of at least 10:1.

The cellulosic fibrils were used to produce cathodes with the following "dry" formulation: 55 wt % sulfur, 30 wt % Vulcan carbon black, 15 wt % cellulosic fibrils. A cathode slurry was made by milling a suspension including the elemental sulfur, carbon black, and cellulose fibrils in water. The total solids content in the slurry was 7 wt %. The slurry was coated on a primed aluminum foil substrate and dried to remove the water. The dry cathode active sulfur loading was 1.9 mg/cm$^2$. This cathode is referred to as the "fibril" cathode below.

For comparative purposes, cathodes comprising a polyvinyl alcohol (PVOH) binder were prepared. To prepare the PVOH-based cathodes, a mixture of 55 wt % sulfur, 40 wt % Vulcan carbon black, and 5 wt % PVOH was prepared. The mixture was milled in a water solution. The resulting slurry was coated on primed Al foil substrate and dried to remove water. The dry cathode active sulfur loading was 1.9 mg/cm$^2$. This cathode is referred to the "PVOH" cathode below.

The "fibril" cathodes had surfaces substantially free of mud cracks. On the other hand, the "PVOH" cathodes had visible mud cracks.

Both the "fibril" cathodes and the "PVOH" cathodes were assembled into pouch cells and electrochemically tested. The active electrode surface area of each cathodes was about 16 cm$^2$. Vacuum deposited lithium films with thicknesses of 25 micrometers were used as the anodes in the electrochemical cells. Celgard2325 separators were applied between the cathodes and anodes in the electrochemical cells. Cells were filled with electrolytes and soaked overnight. An electrolyte comprising primarily 1,2-Dimethoxyethane, 1,3-Dioxolane, and LiTFSI (with the balance being LiNO$_3$ and guanidine nitrate) was added to the pouch cells. The pouch cells were discharged at a current density of 0.06 mA/cm$^2$, with an end of discharge voltage of 1.7 V.

Electrochemical cells including "fibril" cathodes delivered a specific charge capacity of 1309 mAh/g of sulfur. Electrochemical cells comprising the "PVOH" cathodes delivered specific discharge capacity of 1253 mAh/g of sulfur.

Example 2

This example describes the benefit of incorporating cellulose fibrils into sulfur cathodes of electrochemical cells, with high sulfur content in the cathode. In this example, the electrochemical cells were subjected to anisotropic forces during charge and discharge of the electrochemical cells.

The cellulosic fibrils were used to produce cathodes with the following "dry" formulation: 70 wt % sulfur, 20 wt % Vulcan carbon black, and 10 wt % cellulosic fibrils. A cathode slurry was made by milling a suspension including the elemental sulfur, carbon black, and cellulose fibrils in water. The total solids content in the slurry was 7.6 wt %. The slurry was coated on a primed aluminum foil substrate and dried to remove the water. The dry cathode active sulfur loading was 2.05 mg/cm$^2$. This cathode is referred to as the "fibril" cathode below.

For comparative purposes, cathodes comprising a polyvinyl alcohol (PVOH) binder were prepared. To prepare the PVOH-based cathodes, a mixture of 70 wt % sulfur, 25 wt % Vulcan carbon black, and 5 wt % PVOH was prepared. The mixture was milled in a water solution. The resulting slurry was coated on primed Al foil substrate and dried to remove water. The dry cathode active sulfur loading was 1.85 mg/cm$^2$. This cathode is referred to the "PVOH" cathode below.

Both the "fibril" cathode and the "PVOH" cathode were assembled into pouch cells and electrochemically tested. The active electrode surface area of each cathode was 16 cm$^2$. Vacuum deposited lithium with a thickness of 25 micrometers was used as the anode in both electrochemical cells. A Celgard2325 separator was applied between cathode and anode in each electrochemical cell. Cells were filled with electrolyte and soaked overnight. An electrolyte comprising primarily 1,2-Dimethoxyethane, 1,3-Dioxolane, and LiTFSI (with the balance being LiNO$_3$ and guanidine nitrate) was added to the pouch cells. An anisotropic force defining a pressure of 10 kg/cm$^2$ (about 98 Newtons/cm$^2$) was applied to the cells, and the cells were discharged under pressure at current density of 0.6 mA/cm$^2$, with an end of discharge voltage of 1.7 V.

The electrochemical cell including the "fibril" cathode delivered a specific discharge capacity of 724 mAh/g of sulfur at a current density of 0.6 mA/cm$^2$. The electrochemical cell comprising the "PVOH" cathode delivered a specific discharge capacity of 237 mAh/g.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An electrode, comprising:
   an electrochemically active material;
   a plurality of electronically conductive particles; and
   electronically non-conductive and/or polymeric fibrils in contact with at least a portion of the electrochemically active material and/or at least a portion of the electronically conductive particles such that:
   at least a portion of the fibrils mechanically join electronically conductive particles to each other, and/or
   at least a portion of the fibrils mechanically join electronically conductive particles to electrochemically active material,
   wherein at least about 50% of the total volume occupied by the fibril material is made up of fibrils having maximum cross-sectional diameters of less than about 1 micrometer and aspect ratios of at least about 10:1.

2. The electrode of claim 1, wherein the electrode is a positive electrode.

3. The electrode of claim 1, wherein the electrochemically active material comprises sulfur.

4. The electrode of claim 3, wherein the electrochemically active material comprises elemental sulfur.

5. The electrode of claim 1, wherein the electrode comprises a binder.

6. The electrode of claim 1, wherein the fibrils comprise a polymer.

7. The electrode of claim 1, wherein the fibrils comprise a polysaccharide.

8. The electrode of claim 7, wherein the fibrils comprise cellulose or a cellulose derivative.

9. An electrode, comprising:
   a layer comprising an electrochemically active material comprising lithium metal and/or a lithium alloy; and
   a protective layer that protects the lithium metal and/or the lithium alloy from non-electrochemical chemical reactions, the protective layer over the layer comprising the electrochemically active material, and the protective layer comprising fibrils and a matrix material;
   wherein:
   at least a portion of the fibrils are electronically non-conductive and/or polymeric,
   at least about 50% of the total volume occupied by the fibril material is made up of fibrils having maximum cross-sectional diameters of less than about 1 micrometer and aspect ratios of at least about 10:1, and
   at least a portion of the fibrils are in contact with the matrix material.

10. The electrode of claim 9, wherein the electrode is a negative electrode.

11. The electrode of claim 9, wherein the protective layer is part of a multi-layer protective structure.

12. The electrode of claim 9, wherein the protective layer is an ion conducting layer.

13. The electrode of claim 9, wherein the matrix material comprises a polymeric material.

14. The electrode of claim 9, wherein the matrix material comprises a ceramic material.

15. The electrode of claim 9, wherein the fibrils comprise a polymer.

16. The electrode of claim 9, wherein the fibrils comprise a polysaccharide.

17. The electrode of claim 16, wherein the fibrils comprise cellulose or a cellulose derivative.

18. A method, comprising:
coating at least a portion of a substrate with a suspension comprising a particulate support material and fibrils suspended in a liquid carrier; and
removing at least a portion of the liquid carrier from the suspension, wherein:
   at least a portion of the fibrils are electronically non-conductive and/or polymeric, and
   at least about 50% of the total volume occupied by the fibril material is made up of fibrils having maximum cross-sectional diameters of less than about 1 micrometer and aspect ratios of at least about 10:1, and
   after at least a portion of the liquid carrier is removed from the suspension, at least a portion of the fibrils mechanically join particles of the particulate support material.

19. The method of claim 18, wherein the fibrils comprise a polymer.

20. The method of claim 18, wherein the fibrils comprise a polysaccharide.

21. The method of claim 20, wherein the fibrils comprise cellulose or a cellulose derivative.

22. The method of claim 18, comprising mixing electrochemically active material with the support material and/or the fibrils.

23. The method of claim 22, wherein the mixing step is performed prior to the coating step.

24. The method of claim 22, wherein the mixing step is performed after the coating step.

25. The method of claim 22, wherein the mixing step is performed after the removing step.

* * * * *

UNITED STATES PATENT AND TRADEMARK OFFICE
CERTIFICATE OF CORRECTION

PATENT NO. : 9,490,478 B2
APPLICATION NO. : 14/197782
DATED : November 8, 2016
INVENTOR(S) : Yuriy V. Mikhaylik et al.

It is certified that error appears in the above-identified patent and that said Letters Patent is hereby corrected as shown below:

In the Specification

Column 19, Line 31, the word "bather" should be "barrier"

Signed and Sealed this
Twenty-fourth Day of January, 2017

Michelle K. Lee
*Director of the United States Patent and Trademark Office*